United States Patent
Kim et al.

(10) Patent No.: US 9,503,002 B2
(45) Date of Patent: Nov. 22, 2016

(54) IMAGE FORMING APPARATUS, MOTOR CONTROL APPARATUS, AND METHOD OF CONTROLLING MOTOR

(71) Applicant: Samsung Electronics Co., Ltd., Suwon-si, Gyeonggi-do (KR)

(72) Inventors: Hak-young Kim, Seoul (KR); Hyoung-il Kim, Hwaseong-si (KR); Yong-ho You, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 126 days.

(21) Appl. No.: 14/245,016

(22) Filed: Apr. 4, 2014

(65) Prior Publication Data
US 2015/0097503 A1  Apr. 9, 2015

(30) Foreign Application Priority Data
Oct. 8, 2013  (KR) .......................... 10-2013-0119844

(51) Int. Cl.
| G02B 5/00 | (2006.01) |
| H02H 7/08 | (2006.01) |
| H02P 1/00 | (2006.01) |
| H02P 3/00 | (2006.01) |
| H02P 7/06 | (2006.01) |
| H02P 7/00 | (2016.01) |

(52) U.S. Cl.
CPC ............... *H02P 7/06* (2013.01); *H02P 7/0066* (2013.01)

(58) Field of Classification Search
CPC ............ H02P 7/0066; H02P 7/28; H02P 7/29; B41J 13/0009
USPC ......................................................... 318/459
See application file for complete search history.

(56) References Cited

U.S. PATENT DOCUMENTS

| 7,049,785 B2 * | 5/2006 | Han ............................... 318/696 |
| 8,508,175 B2 * | 8/2013 | Hioki ............................ 318/685 |
| 8,629,643 B2 * | 1/2014 | Tachibana et al. ............ 318/696 |
| 2012/0330595 A1 * | 12/2012 | Atay ............................... 702/96 |
| 2014/0219698 A1 * | 8/2014 | Ishizuka et al. .............. 400/578 |

* cited by examiner

*Primary Examiner* — Erick Glass
(74) *Attorney, Agent, or Firm* — Staas & Halsey LLP

(57) ABSTRACT

An image forming apparatus includes an engine portion configured to perform image forming, a direct current (DC) motor configured to mechanically operate the engine portion, a driver including a resistor to measure current that flows to the DC motor according to the measured current and configured to provide a predetermined voltage to the DC motor, and a drive controller configured to measure a driving speed of the DC motor based on a voltage value of the resistor and to control the driver to provide a voltage that corresponds to the measured driving speed to the driver.

16 Claims, 24 Drawing Sheets

IMAGE FORMING APPARATUS, MOTOR CONTROL APPARATUS, AND METHOD OF CONTROLLING MOTOR

CROSS-REFERENCE TO RELATED APPLICATIONS

This application claims the benefit of priority under 35 U.S.C. §119(a) to Korean Patent Application No. 10-2013-0119844, filed on Oct. 8, 2013, in the Korean Intellectual Property Office, the disclosure of which is incorporated herein in its entirety by reference.

BACKGROUND OF THE INVENTION

1. Field of the Invention

The present general inventive concept relates to an image forming apparatus, a motor control apparatus, and a method of controlling a motor, and more particularly to an image forming apparatus, a motor control apparatus, and a method of controlling a motor in which a back electromotive force (EMF) of a direct current (DC) motor may be sensed using a resistor that is connected in series to the DC motor, and in which a voltage that is supplied to the DC motor may be varied in accordance with a driving speed that corresponds to the sensed back EMF.

2. Description of the Related Art

An image forming apparatus is an apparatus which performs generation, printing, reception, and transmission of image data. Representative examples thereof may include a printer, a copy machine, a facsimile, and a multifunction peripheral (MFP) in which the functions of the above-described devices are combined.

In such an image forming apparatus, motors that perform various functions, such as conveyance of print sheets and feeding of print sheets, are used. More recently, with the ability to attach optional units to an image forming apparatus to perform various functions, such as, for example, an Auto Document Feeder (ADF) unit, a finisher unit, a High Capacity Feeder (HCF) unit, and a Double Capacity Feeder (DCF) unit, the number of motors has increased to be useable in an image forming apparatus.

Although various kinds of motors may be used in an image forming apparatus, DC motors are most common. A DC motor is a motor that uses direct current power. In order to drive such a DC motor at a desired speed, it is necessary to generate a voltage command value using speed information acquired by a sensor that detects a rotating speed of the DC motor, and a speed command value of a processor, and to provide a pulse-width modulated (PWM) signal that corresponds to the generated voltage command value to the DC motor.

In order to make the DC motor follow the speed command value, acquisition of the speed information from the sensor is required. Accordingly, a sensor that can sense the speed of the DC motor is required to control the DC motor speed, and a space to mount the sensor therein is also required.

SUMMARY OF THE INVENTION

The present general inventive concept addresses at least the above problems and/or disadvantages and provides at least the advantages described below. Accordingly, the present general inventive concept provides an image forming apparatus, a motor control apparatus, and a method of controlling a motor in which a back electromotive force (EMF) of a DC motor may be sensed using a resistor that is connected in series to the DC motor, and in which a voltage that is supplied to the DC motor may be varied in accordance with a driving speed that corresponds to the sensed back EMF.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an image forming apparatus that includes an engine portion configured to perform image forming, a direct current (DC) motor configured to mechanically operate the engine portion, a driver including a resistor to measure current that flows to the DC motor and configured to provide a predetermined voltage to the DC motor according to the measured current, and a drive controller configured to measure a driving speed of the DC motor based on a voltage value of the resistor and to control the driver to provide a voltage that corresponds to the measured driving speed to the driver.

The drive controller may include a sensor configured to sense the voltage value of the resistor, a calculator configured to calculate the driving speed of the DC motor based on the sensed voltage value, a determinator configured to determine a level of the DC voltage to be supplied to the DC motor based on the calculated driving speed, and an outputter configured to output a control value that corresponds to the determined DC voltage level to the driver.

The sensor may be configured to perform smoothing and to sense the voltage value of the resistor.

The sensor may include a low pass filter connected to one terminal of the resistor of the driver, and may be configured to sense an output voltage of the low pass filter as the voltage value of the resistor.

The calculator may be configured to calculate the driving speed of the DC motor based on the sensed voltage value and the voltage value that is applied to the DC motor.

The calculator may be configured to calculate a back EMF of the DC motor based on a following equation, and to calculate the driving speed of the DC motor using the calculated back EMF and a back EMF constant, $$V\text{emf} = V\text{in} - \{(Rm+Rs)/Rs\} * V\text{sense}$$

where, Vemf denotes the voltage value that corresponds to the calculated driving speed, Vin denotes the voltage value input to the DC motor, Vsense denotes the voltage value of the resistor, Rm denotes the resistance value of the DC motor, and Rs denotes the resistance value of the resistor.

The calculator may include an amplifier configured to amplify the sensed voltage value, and to calculate the driving speed of the DC motor based on the voltage value that is amplified by the amplifier.

The determinator may be configured to determine a speed error value based on the calculated driving speed, and to determine a pulse-width modulation (PWM) duty cycle that corresponds to the level of the DC voltage to be supplied to the DC motor based on the determined speed error value.

The determinator may be configured to compare the calculated driving speed with a target driving speed, and if the calculated driving speed is higher than the target driving speed, the determinator may be configured to output a control signal to reduce a PWM duty cycle that corresponds to the level of the DC voltage to be supplied to the DC motor, while if the calculated driving speed is lower than the target driving speed, the determinator may be configured to output a control signal to increase the PWM duty cycle.

The drive controller may be configured to sense whether the DC motor is in an abnormal state based on the calculated driving speed.

A plurality of DC motors and drivers may be provided, and the drive controller may be configured to control each of the plurality of drivers to measure a respective driving speed of a corresponding one of the plurality of DC motors and to provide a respective driving voltage to the corresponding one of the plurality of DC motors that corresponds to the respective driving speed.

The foregoing and/or other features and utilities of the present inventive concept also provide a motor control apparatus that includes a direct current (DC) motor, a driver including a resistor configured to measure current that flows to the DC motor and configured to provide a predetermined voltage to the DC motor, and a drive controller configured to measure a driving speed of the DC motor based on a voltage value of the resistor and to control the driver to provide a voltage that corresponds to the measured driving speed.

The drive controller may include a sensor configured to sense the voltage value of the resistor, a calculator configured to calculate the driving speed of the DC motor based on the sensed voltage value, a determinator configured to determine a level of the DC voltage to be supplied to the DC motor based on the calculated driving speed, and an outputter configured to output a control value that corresponds to the determined DC voltage level to the driver.

The sensor may be configured to perform smoothing and to sense the voltage value of the resistor.

The calculator may be configured to calculate a back EMF of the DC motor based on the sensed voltage value and the voltage value that is applied to the DC motor, and to calculate the driving speed of the DC motor using the calculated back EMF and a back EMF constant.

The determinator may be configured to determine a speed error value based on the calculated driving speed, and to determine a pulse-width modulation (PWM) duty cycle that corresponds to the level of the DC voltage to be supplied to the DC motor based on the determined speed error value.

The determinator may be configured to determine an accumulated speed error value through accumulation of speed error values, and to determine the PWM duty cycle based on the determined accumulated speed error value.

The determinator may be configured to compare the calculated driving speed with a target driving speed, and if the calculated driving speed is higher than the target driving speed, the determinator may be configured to output a control signal to reduce a PWM duty cycle that corresponds to the level of the DC voltage to be supplied to the DC motor, while if the calculated driving speed is lower than the target driving speed, the determinator may be configured to output a control signal to increase the PWM duty cycle.

The drive controller may be configured to sense whether the DC motor is in an abnormal state based on the calculated driving speed.

The foregoing and/or other features and utilities of the present inventive concept also provide a method of controlling a direct current (DC) motor that includes receiving a control command for the DC motor, and providing a predetermined voltage to the DC motor in accordance with the control command, wherein the providing the predetermined voltage includes measuring a driving speed of the DC motor based on current that flows to a coil of the DC motor, and providing a voltage having a level that corresponds to the measured driving speed.

The foregoing and/or other features and utilities of the present inventive concept also provide a non-transitory computer-readable recording medium containing instructions which, when executed by a controller, cause the controller to receive a control command for a direct current (DC) motor, and to provide a predetermined voltage to the DC motor in accordance with the control command, wherein providing the predetermined voltage includes measuring a driving speed of the DC motor based on current that flows to a coil of the DC motor, and providing a voltage having a level that corresponds to the measured driving speed.

The foregoing and/or other features and utilities of the present inventive concept also provide a method of determining an abnormal state of a direct current motor that includes determining at a controller a back EMF of the DC motor from a current that flows through a resistor connected to the DC motor, if the determined back EMF is less than a specific level, determining at the controller a period of time at which the determined back EMF has been less than the specific level and if the period of time is greater than a specific period of time, determining at the controller at least one of that a current does not flow through the DC motor and that the current that flows through the DC motor leaks.

The foregoing and/or other features and utilities of the present inventive concept also provide a non-transitory computer-readable recording medium containing instructions which, when executed by a controller, cause the controller to determine a back EMF of the DC motor from a current that flows through a resistor connected to the DC motor, if the determined back EMF is less than a specific level, to determine a period of time at which the determined back EMF has been less than the specific level and if the period of time is greater than a specific period of time, to determine at least one of that a current does not flow through the DC motor and that the current that flows through the DC motor leaks.

The foregoing and/or other features and utilities of the present inventive concept also provide a method of determining an abnormal state of a direct current motor that includes determining at a controller a back EMF of the DC motor from a current that flows through a resistor connected to the DC motor if the determined back EMF is greater than a specific level, determining at the controller a period of time at which the determined back EMF has been greater than the specific level, and if the period of time is greater than a specific period of time, determining at the controller that the DC motor is overloaded.

The foregoing and/or other features and utilities of the present inventive concept also provide a non-transitory computer-readable recording medium containing instructions which, when executed by a controller, cause the controller to determine a back EMF of the DC motor from a current that flows through a resistor connected to the DC motor, if the determined back EMF is greater than a specific level, to determine a period of time at which the determined back EMF has been greater than the specific level, and if the period of time is greater than a specific period of time, to determine that the DC motor is overloaded.

The foregoing and/or other features and utilities of the present inventive concept also provide a method of determining an abnormal state of a direct current motor that includes determining at a controller a pulse-width modulation duty cycle from a current that flows through a resistor connected to the DC motor, if the determined pulse-width modulation duty cycle is at 100 percent, determining at the controller a period of time at which the determined pulse-width modulation duty cycle has been at 100 percent, and if the period of time is greater than a specific period of time, determining at the controller that the DC motor has stalled.

The foregoing and/or other features and utilities of the present inventive concept also provide a non-transitory computer-readable recording medium containing instructions which, when executed by a controller, cause the controller to determine a pulse-width modulation duty cycle from a current that flows through a resistor connected to the DC motor, if the determined pulse-width modulation duty cycle is at 100 percent, to determine a period of time at which the determined pulse-width modulation duty cycle has been at 100 percent, and if the period of time is greater than a specific period of time, to determine that the DC motor has stalled.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
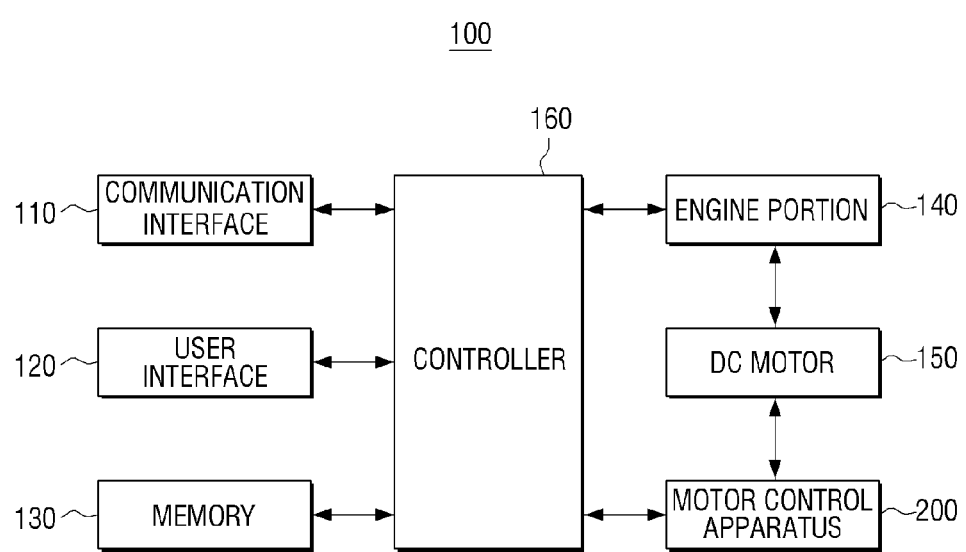
FIG. 1 is a diagram illustrating a configuration of an image forming apparatus according to an embodiment of the present inventive concept.

Reference will now be made in detail to the embodiments of the present inventive concept, examples of which are illustrated in the accompanying drawings, wherein like reference numerals refer to the like elements throughout. The embodiments are described below in order to explain the present general inventive concept while referring to the figures.

FIG. 1 is a diagram illustrating a configuration of an image forming apparatus according to an embodiment of the present inventive concept.

Referring to FIG. 1, an image forming apparatus 100 may include a communication interface 110, a user interface 120, a memory 130, an engine portion 140, a DC motor 150, a controller 160, and a motor control apparatus 200.

For example, the image forming apparatus 100 may be an apparatus which performs generation, printing, reception, and transmission of image data, and may be a printer, a copy machine, a facsimile, and a multifunction peripheral (MFP) in which the functions of the above-described devices are combined. Although the description of this embodiment of the present inventive concept suggests that it only applies to an image forming apparatus configured to form an image, the present inventive concept is not limited to such an embodiment and may also be applied to an image reading apparatus, such as, for example, a scanner.

The communication interface 110 may be connected to a print control terminal device (not illustrated), such as, for example, a personal computer (PC), a notebook PC, a personal digital assistant (PDA), or a digital camera. The communication interface 110 may be formed to connect the image forming apparatus 100 to an external device (not illustrated). For example, the communication interface 110 may connect to a print control terminal device (not illustrated) through not only a local area network (LAN) and the Internet, but also a Universal Serial Bus (USB) port. Further, the communication interface 110 may be implemented to connect to the print control terminal device not only through a wired method, but also through a wireless method.

The communication interface 110 may receive print data from the print control terminal device (not illustrated). Further, if the image forming apparatus 100 has a scanner function, the communication interface 110 may transmit generated scan data to the print control terminal device or an external server (not illustrated).

The user interface 120 may be provided with a plurality of function keys for a user to set or select various kinds of functions supported by the image forming apparatus 100, and may display various kinds of information provided from the image forming apparatus 100. The user interface 120 may be implemented by a device through which input and output operations may be simultaneously performed, such as, for example, a touch screen, or through a combination of input devices, such as, for example, a mouse (or a keyboard or a plurality of buttons), and a monitor. A user may control a print operation of the image forming apparatus 100 by using a user interface window (not illustrated) provided through the user interface 120.

Further, the user interface 120 may display an operation state of the image forming apparatus 100. For example, the user interface 120 may display whether a DC motor 150, which is described below, is in a normal operation state. For example, if the DC motor 150 is overloaded or the DC motor 150 has stalled, the user interface 120 may display information to the user that corresponds to these states.

The memory 130 may store print data. For example, the memory 130 may store print data that is received through the communication interface 110. The memory 130 also may store lookup data to control the DC motor 150. For example, the lookup data may be a target driving speed table that corresponds to a control command for the DC motor 150, and may be a lookup table for voltage control values (e.g., a pulse-width modulation (PWM) duty cycle) that correspond to a plurality of sensing voltages Vsense, or a lookup table for voltage control values (e.g., a PWM duty cycle) that correspond to a plurality of back electromotive forces Vemf.

Although the description of this embodiment of the present inventive concept suggests that the lookup table may only be stored in the memory 130, the present inventive concept is not limited to such an embodiment. For example, the lookup table alternatively may be stored in the motor control apparatus 200, which is described below.

The memory 130 may store drive information of the DC motor 150. For example, the memory 130 may store drive information that may be transferred from the motor control apparatus 200. For example, the drive information may include information about the driving speed of the DC motor 150, information about whether the DC motor 150 is driven, and/or information about whether the DC motor 150 is in a problematic state.

The memory 130 may be implemented by a storage medium in the image forming apparatus 100 or by an external storage medium, for example, a removable disk including a USB memory or a web server through a network.

The engine portion 140 may perform image forming. For example, the engine portion 140 may perform an image forming job under the control of the controller 160 and may be mechanically operated by the DC motor 150. Although the description of this embodiment of the present inventive concept suggests that the engine portion 140 only may perform an image forming job, the present inventive concept is not limited to such an embodiment. For example, if the image forming apparatus 100 is a scanner configured to perform scan work or a multifunction peripheral, the engine portion 140 may be configured to perform an image reading job.

The DC motor 150, which may be provided, for example, inside the image forming apparatus 100, may operate at constant speed or may accelerate in accordance with a level of input current. For example, the DC motor 150 may be a motor configured to perform various functions of the image forming apparatus 100, such as, for example, organic photosensitive drum (OPC) driving, fuser driving, and sheet conveyance.

The motor control apparatus 200 may generate a driving signal (e.g., a driving voltage) for the DC motor 150 in accordance with a control command. A detailed configuration and operation of the motor control apparatus 200 is described below with reference to FIG. 2.

The motor control apparatus 200 may measure a voltage across a resistor (hereinafter referred to as a "sensing resistor") connected in series to the DC motor 150, may calculate the driving speed of the DC motor 150 through calculation of the back EMF of the DC motor 150 in accordance with the measured voltage, and may provide the calculated driving speed of the DC motor 150 to the controller 160 as drive information. A method of measuring the drive information of the motor control apparatus 200 is described below with reference to FIG. 2.

The controller 160 may control respective configurations of the image forming apparatus 100. For example, if print data is received from a print control terminal device (not illustrated), the controller 160 may control the operation of the engine portion 140 to print the received print data, and may transmit a control command for the DC motor 150 to the motor control apparatus 200 to mechanically operate the engine portion 140. For example, the controller 160 may transmit a control command, such as a start/stop of a rotation of the DC motor 150, an acceleration/deceleration command for the DC motor 150, and/or a speed command value for the DC motor 150, to the motor control apparatus 200. Although the description of this embodiment of the present inventive concept suggests that only the controller 160 may transmit the control command for the DC motor 150, the present inventive concept is not limited to such an embodiment. For example, alternatively, the engine portion 140 may transmit the control command.

The controller 160 may receive load information of the DC motor 150 from the motor control apparatus 200, and may determine whether the DC motor 150 is in a normal operation state based on the received load information. For example, if it is determined that the DC motor 150 is in an abnormal operation state, the controller 160 may control the user interface 120 to display a warning message. Although the description of this embodiment of the present inventive concept suggests that only the controller 160 may determine whether the DC motor 150 is in a normal operation state, the present inventive concept is not limited to such an embodiment. For example, alternatively, the motor control apparatus 200 may determine whether the DC motor 150 is in a normal operation state, and if the DC motor 150 is in an abnormal operation state, the motor control apparatus 200 may cause a message about this state to be sent to the controller 160. A method of determining whether the DC motor 150 is in a normal operation state is described below with reference to FIGS. 16 and 17.

As described above, the image forming apparatus 100 according to this embodiment of the present inventive concept may calculate the driving speed of the DC motor 150 using a sensing resistor 214 (see FIGS. 5, 6, 9, 10, and 13-15) to sense current that flows through the DC motor 150, and may control the DC motor 150 in accordance with the calculated driving speed. In this case, since it is not necessary to use a sensor to measure the speed, the manufacturing cost of the image forming apparatus 100 may be reduced. Further, since it is not necessary to provide a space to accommodate such a sensor, the space used for a mechanical portion of the image forming apparatus 100 may be reduced.

Further, the image forming apparatus 100 according to this embodiment of the present inventive concept may be provided with the drive information of the DC motor 150, and thus may quantitatively calculate the driving speed of the DC motor 150. Further, according to this embodiment of the present inventive concept, the image forming apparatus 100 may determine whether the DC motor 150 is in a normal or abnormal operation state based on the load information about the DC motor 150, and may provide information about the operation state to a user and/or a manager.

FIG. 1 illustrates an embodiment of the present inventive concept in which the DC motor 150 and the motor control apparatus 200 are separately configured. However, alternatively, the DC motor 150 may be implemented in a configuration within the motor control apparatus 200. Below, a detailed configuration of the motor control apparatus 200 is described with reference to FIG. 2.

Figure 2:
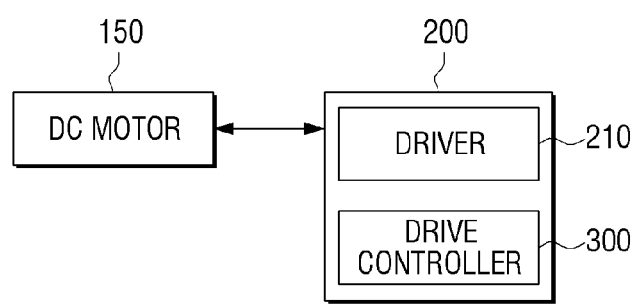
FIG. 2 is a diagram illustrating a configuration of an example of a motor control apparatus illustrated in FIG. 1.
Figure 3:
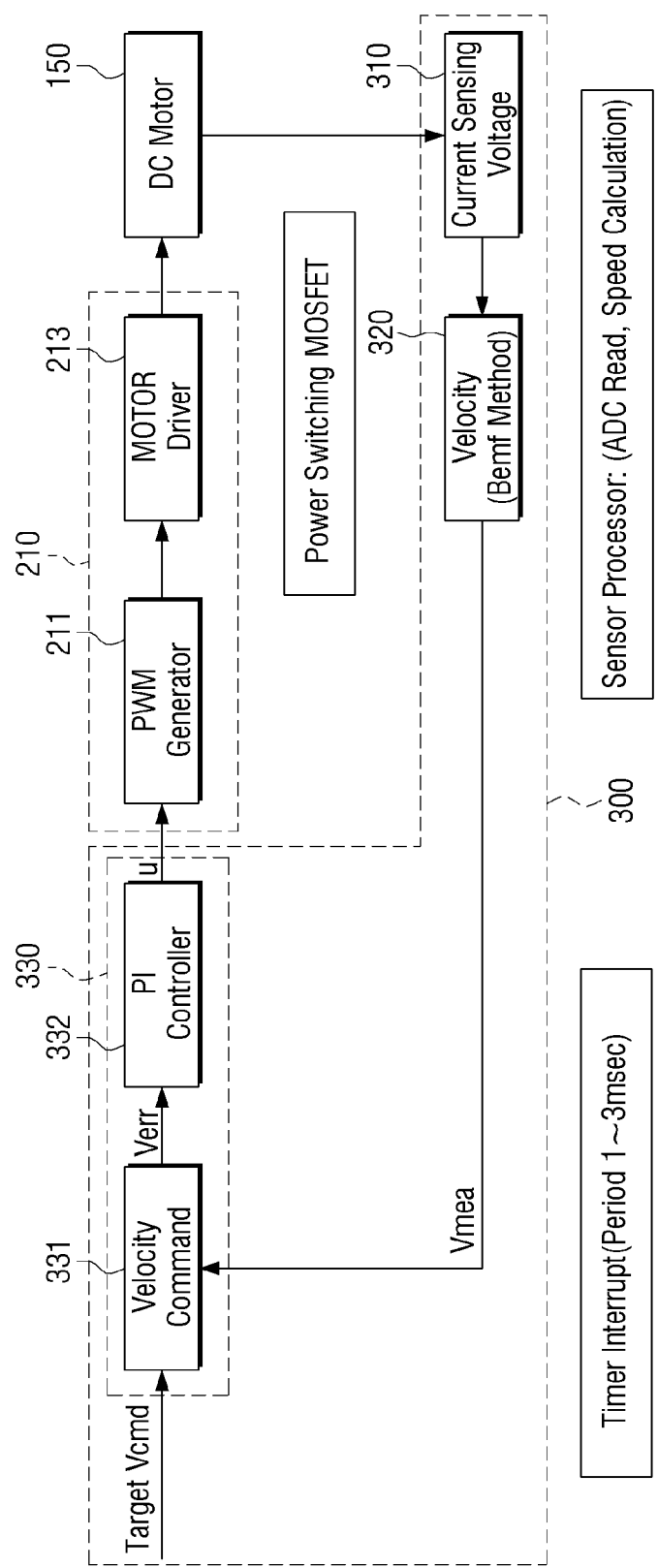
FIG. 3 is a diagram illustrating a detailed configuration of an example of the motor control apparatus illustrated in FIG. 1.

FIG. 2 is a diagram illustrating a configuration of an example of the motor control apparatus 200 illustrated in FIG. 1, and FIG. 3 is a diagram illustrating a detailed configuration of an example of the motor control apparatus 200 illustrated in FIG. 1.

Referring to FIGS. 2 and 3, the motor control apparatus 200 according to this embodiment of the present inventive concept may include a driver 210 and a drive controller 300. In the illustrated example, that the DC motor 150 is not provided within the motor control apparatus 200. However, the motor control apparatus 200 may be implemented to include the DC motor 150.

The driver 210 may include the sensing resistor 214 (see FIGS. 5, 6, 9, 10, and 13-15) to measure current that flows to the coil of the DC motor 150, and may provide a predetermined voltage to the DC motor 150. For example, the driver 210 may provide a DC voltage that corresponds to a driving signal (e.g., a PWM duty cycle or a control signal) that may be transferred from the drive controller 300 to the DC motor 150. A detailed configuration and operation of the driver 210 is described below with reference to FIGS. 5 and 6.

The drive controller 300 may receive a control command from the controller 160, and may control the driving state of the DC motor 150 via control of the driver 210. For example, the drive controller 300 may receive a control command for the DC motor 150 from the controller 160. For example, the control command may include control commands for a start/stop of a rotation of the DC motor 150, an acceleration/deceleration command for the DC motor 150, and/or a speed command value for the DC motor 150.

The above-described control command may be received from the controller 160 through a Serial Peripheral Interface (SPI) (not illustrated), which is an interface that enables two devices to exchange data through serial communication, and/or through a serial communication interface, such as, for example, an Inter-Integrated Circuit ($I^2C$), which is a bidirectional serial bus used to attach low-speed peripherals.

The drive controller 300 may generate a driving signal for the DC motor 150 according to the received control command. For example, the drive controller 300 may generate a driving signal (e.g., a PWM duty cycle) that corresponds to the control command.

In this case, the drive controller 300 may calculate the driving speed of the DC motor 150 through a measurement of the voltage value of the sensing resistor 214 (see FIGS. 5, 6, 9, 10, and 13-15) that is connected to the DC motor 150, and may perform feedback control with respect to the driving signal based on the calculated driving speed. Such an operation is described below with reference to FIG. 4.

The drive controller 300 may provide the measured driving speed to the controller 160. Further, the drive controller 300 may determine whether the DC motor 150 is in a normal operation state through comparison of the measured driving speed with pre-stored information about speed during normal operation. The operation of the drive controller 300 is described below with reference to FIGS. 16 and 17.

As described above, the motor control apparatus 200 according to this embodiment of the present inventive concept may sense the driving speed of the DC motor 150 using the sensing resistor 214 that is connected in series to the DC motor 150 without using a separate sensor, and may perform a feedback control operation of the DC motor 150 according to the sensed driving speed. Further, the motor control apparatus 200 may monitor a change of the speed of the DC motor 150 in real time in a set operation state, and may quantitatively calculate the change of the speed. Further, the motor control apparatus 200 may determine a normal or abnormal state according to a state of the change of the speed, and if an abnormal load state is sensed, the motor control apparatus 200 may be notified about the normal state and/or may perform a feedback control operation.

Figure 20:
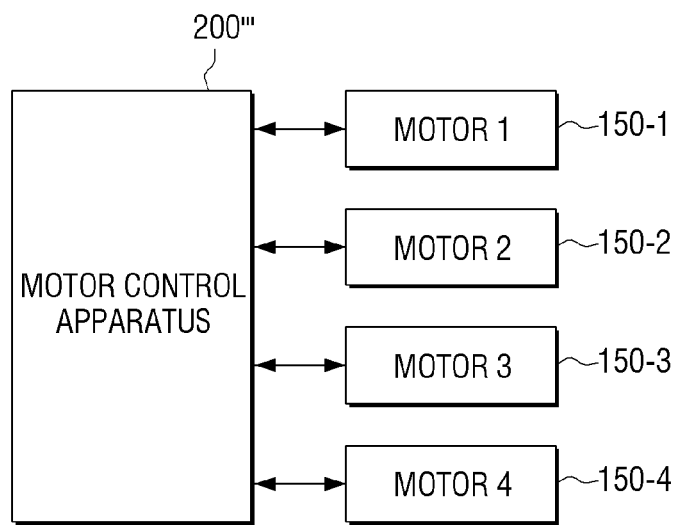
FIG. 20 is a diagram illustrating a configuration of an image forming apparatus according to another embodiment of the present inventive concept.

Although the description of this embodiment of the present inventive concept with reference to FIGS. 2 and 3 suggests that one motor control apparatus 200 controls only one DC motor 150, the present inventive concept is not limited to such an embodiment. For example, as illustrated in FIG. 20, one motor control apparatus 200''' may be configured to control two or more DC motors 150-1, 150-2, 150-3, and 150-4, or one motor control apparatus 200 may be configured to control a brushless DC electric (BLDC) motor (not illustrated) and/or a step motor (not illustrated), which are different types of DC motors, while controlling the DC motor 150.

Further, although in the description of this embodiment of the present inventive concept with reference to FIGS. 2 and 3 the driver 210 and the drive controller 300 are separately configured, the present inventive concept is not limited to such an embodiment. For example, alternatively, the driver 210 and the drive controller 300 may be configured within a common unit.

Figure 4:
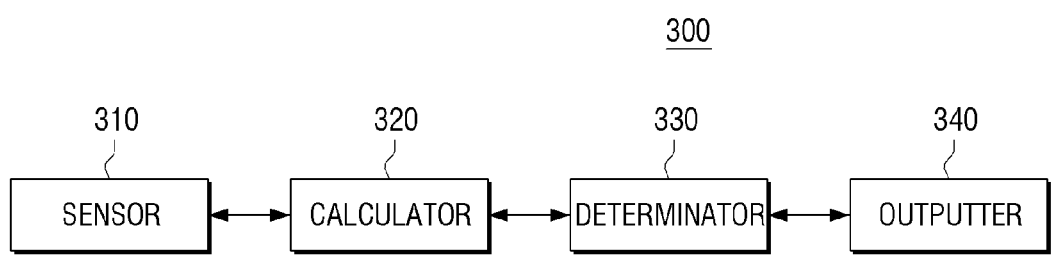
FIG. 4 is a diagram illustrating a detailed configuration of an example of a drive controller illustrated in FIG. 2.

FIG. 4 is a diagram illustrating a detailed configuration of an example of the drive controller 300 illustrated in FIG. 2.

Referring to FIG. 4, the drive controller 300 may include a sensor 310, a calculator 320, a determinator 330, and an outputter 340.

The sensor 310 may sense a voltage value of the sensing resistor 214 (see FIGS. 5, 6, 9, 10, and 13-15). For example, the sensor 310 may sense the voltage value of the sensing resistor 214 of the driver 210. In this case, the sensor 310 may output a representation of the sensed voltage value of the sensing resistor 214 as the measured value. For example, the sensor 310 may include a low pass filter 311 (see FIGS. 5, 6, 9, 10, and 13-15) connected to one terminal of the sensing resistor 214, and may provide an output voltage of the low pass filter as the sensed voltage value Vsense. For example, the DC motor 150 may receive an input of DC power that is generated by a PWM signal, and thus the measured voltage of the sensing resistor 214 may contain large amounts of noise. Accordingly, in this embodiment of the present inventive concept, the voltage value of the sensing resistor 214 may be sensed using the low pass filter 311 (see FIGS. 5, 6, 9, 10, and 13-15). Although the description of this embodiment of the present inventive concept suggests that the voltage of the sensing resistor 214 only may be sensed using the low pass filter, the present inventive concept is not limited to such an embodiment. For example, alternatively, any other element that may remove noise, such as an integrator and/or a charge pump, may be used to sense the voltage of the sensing resistor 214.

The calculator 320 may calculate a back EMF of the DC motor 150 based on the sensed voltage value Vsense (e.g., the DC voltage of the sensing resistor 214 hereinafter referred to as a "sensed voltage value"). For example, the calculator 320 may calculate the back EMF of the DC motor 150 based on the sensed voltage value that is output from the sensor 310 and the DC voltage value that is applied to the DC motor 150. In this case, the calculator 320 may calculate the back EMF of the DC motor 150 based on Equation 4 below. In this case, the calculator 320 may output the calculated back EMF as a voltage value Vemf, and this voltage value may be used as a factor that indicates the driving speed of the DC motor 150. Hereinafter, the output voltage value Vemf may be referred to as a "speed voltage value."

The calculator 320 may calculate the driving speed of the DC motor 150 based on the sensed back EMF. For example, the calculator 320 may calculate the driving speed of the DC motor 150 using the back EMF Vemf calculated as described above and a back EMF constant. In this case, the calculator 320 may calculate the driving speed of the DC motor 150 based on Equation 4. The back EMF constant may be a slope of the back EMF of the motor with respect to the motor speed. Motors of the same type may have the same constant value.

The determinator 330 may generate the driving signal (e.g., a PWM duty cycle) that corresponds to the control command. In this case, the determinator 330 may perform feedback control with respect to the driving signal using the driving speed that is calculated by the calculator 320. For example, the determinator 330 may determine a speed error value based on the calculated driving speed, and may determine the PWM duty cycle that corresponds to the level of the DC voltage to be supplied to the DC motor 150 based on the determined speed error value. In this case, the determinator 330 may determine an accumulated speed error value through accumulation of speed error values for a predetermined period of time, and may determine the PWM duty cycle based on the determined accumulated speed error value.

Alternatively, the determinator 330 may compare the driving speed that is calculated by the calculator 320 with a target driving speed without calculating the speed error value, and if the calculated driving speed is higher than the target driving speed, the determinator 330 may output a control signal to reduce the PWM duty cycle that corresponds to the level of the DC voltage to be supplied to the DC motor 150. However, if the calculated driving speed is lower than the target driving speed, the determinator 330 may output a control signal to increase the PWM duty cycle that corresponds to the level of the DC voltage to be supplied to the DC motor 150.

The determinator 330 may be implemented, for example, in hardware or software. An example of a determinator 330 that is implemented in software is described below with reference to FIGS. 9 to 11, and an example of a determinator 330 that is implemented in hardware is described below with reference to FIGS. 13 to 15.

The outputter 340 may output a control value (e.g., a PWM duty cycle) that corresponds to the determined voltage level to the driver 210. Although the description of this embodiment of the present inventive concept suggests that the determinator 330 and the outputter 340 are separately configured, the present inventive concept is not limited to such an embodiment. For example, the determinator 330 and the outputter 340 may be configured within a common unit.

As described above, the drive controller 300 according to this embodiment of the present inventive concept may sense the driving speed of the DC motor 150 without using a separate sensor. For example, only the configurations of the sensor 310 and the calculator 320 may be used as a speed sensing device of the DC motor 150.

FIG. 4 illustrates that the drive controller 300 may be implemented in a plurality of configurations. For example, at least two of the elements illustrated in FIG. 4 may be configured within a common unit. For example, the sensor 310 and the calculator 320 may be implemented in a load sensing device as described above, and the determinator 330 and the outputter 340 may also be configured within a common unit. Alternatively, for example, the calculator 320, the determinator 330, and the outputter 340 may be implemented in one application-specific integrated circuit (ASIC) chip. That is, in an embodiment of the present inventive concept, only the sensor 310 may be implemented in a hardware configuration, and the remaining elements may be configured to operate in software within a common unit.

Additionally, in a configuration, for example, the sensor 310, the calculator 320, the determinator 330, and the outputter 340 may be implemented in an ASIC chip that has an analog-to-digital converter (ADC) (not illustrated).

Figure 5:
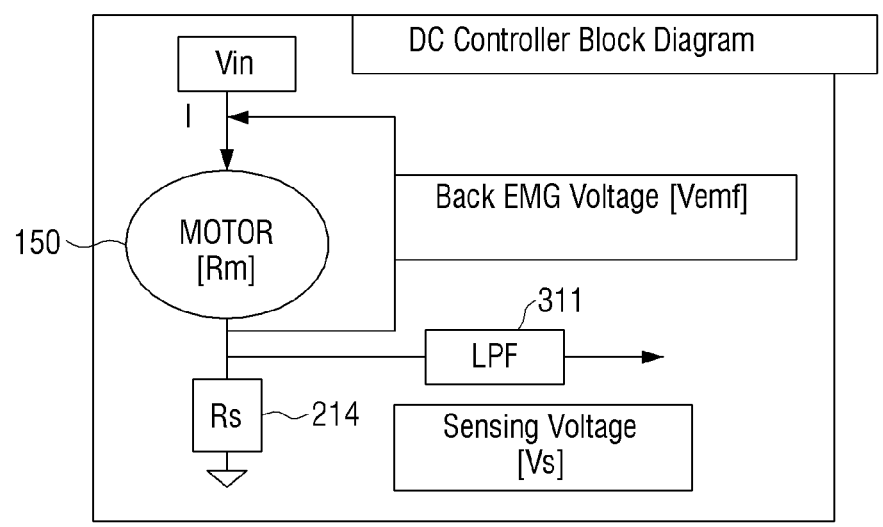
FIGS. 5 and 6 are diagrams illustrating a detailed configuration of an example of a driver illustrated in FIG. 2.
Figure 6:
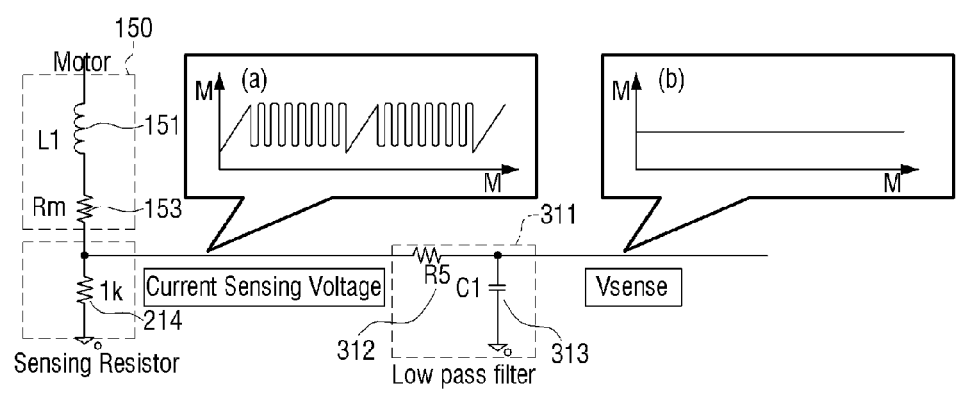

FIGS. 5 and 6 are diagrams illustrating a detailed configuration of an example of the driver 210 illustrated in FIG. 2.

Referring to FIGS. 3, 5, and 6, the driver 210 may include a PWM signal generator 211, a motor driver 213, and the sensing resistor 214.

The PWM signal generator 211 may generate a PWM signal according to the PWM duty cycle that is provided from the drive controller 300. For example, PWM signal generator 211 may be a commercial integrated circuit (IC) that generates the PWM signal according to the provided PWM duty cycle.

The motor driver 213 may provide a DC voltage that corresponds to the PWM signal to the DC motor 150. For example, the motor driver 213 may comprise a switch 215 (see FIGS. 9, 10, and 13-15), which may be turned on/off according to the PWM signal that may be provided from the PWM signal generator 221 so that a voltage of a predetermined level may be provided to the DC motor 150.

The sensing resistor 214 may be a resistor configured to measure current that flows to a coil 151 of the DC motor 150. For example, one end of the sensing resistor 214 may be connected to one terminal of the coil 151, and the other terminal of the sensing resistor 214 may be connected to ground. For example, the voltage value of the sensing resistor 214 may be a value that represents a change of current that flows to the coil 151 of the DC motor 150, and the drive controller 300 may measure the voltage at one terminal of the sensing resistor 214 and may use the measured voltage for feedback control.

Alternatively, the motor driver 213 may provide the voltage to the DC motor 150 according to the provided PWM signal, and the DC motor 150 may be driven by the level of the voltage, which may correspond to the duty cycle of the PWM signal. For example, as illustrated in a view (a) of FIG. 6, the voltage value of the sensing resistor 214, which may represent the change of current that flows to the DC motor 150, may exhibit repeated rising and chopping operations.

As described above, during the operation of the driver 210, the sensor 310 may sense the voltage value of the sensing resistor 214. For example, the sensor 310 may include the low pass filter 311, which may perform smoothing of the voltage value of the sensing resistor 214 to output the voltage value as a DC voltage value as illustrated at a view (b) of FIG. 6.

In this embodiment of the present inventive concept, the low pass filter 311 may be configured using a resistor R5 312 and a capacitor C1 313. Alternatively, for example, the low pass filter 311 may be configured using an inductor (not illustrated) and a capacitor (not illustrated), and may be implemented as an N-th order low pass filter that is equal to or higher than the second order. Alternatively, for example, the low pass filter 311 may be configured as an active filter (e.g., an integrator) and may be implemented using an operational amplifier (OP-amp).

Below, the reason why the sensed voltage value may be used as a value that represents the driving speed of the DC motor 150 is explained with reference to FIGS. 7 and 8.

Figure 7:
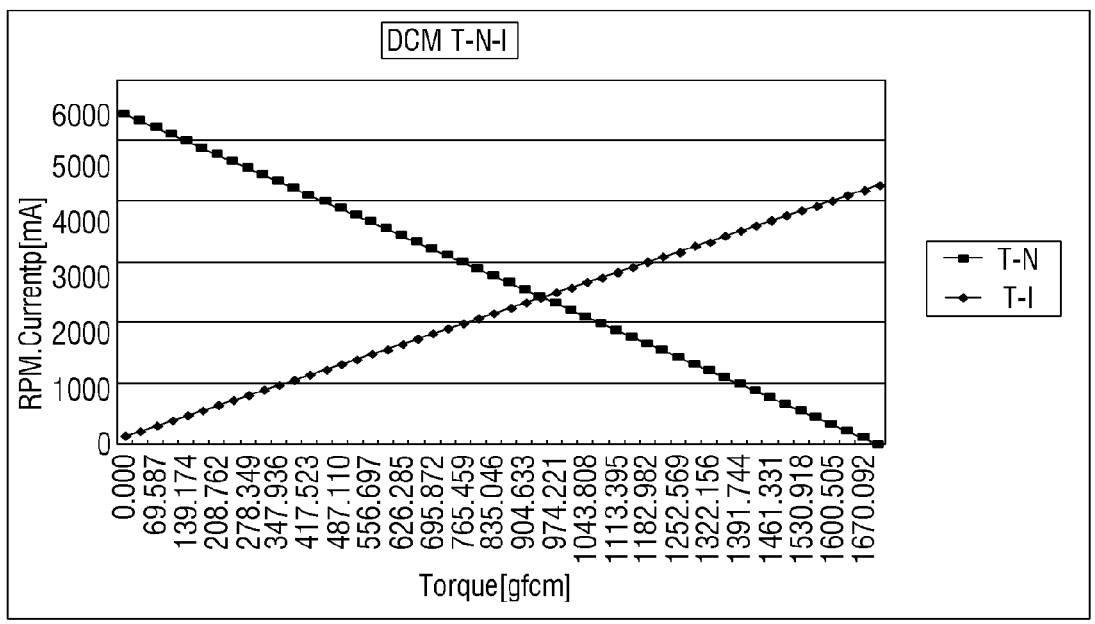
FIGS. 7 and 8 are graphs illustrating a relationship between torque and rotations per minute (RPM) with respect to input current of a DC motor.
Figure 8:
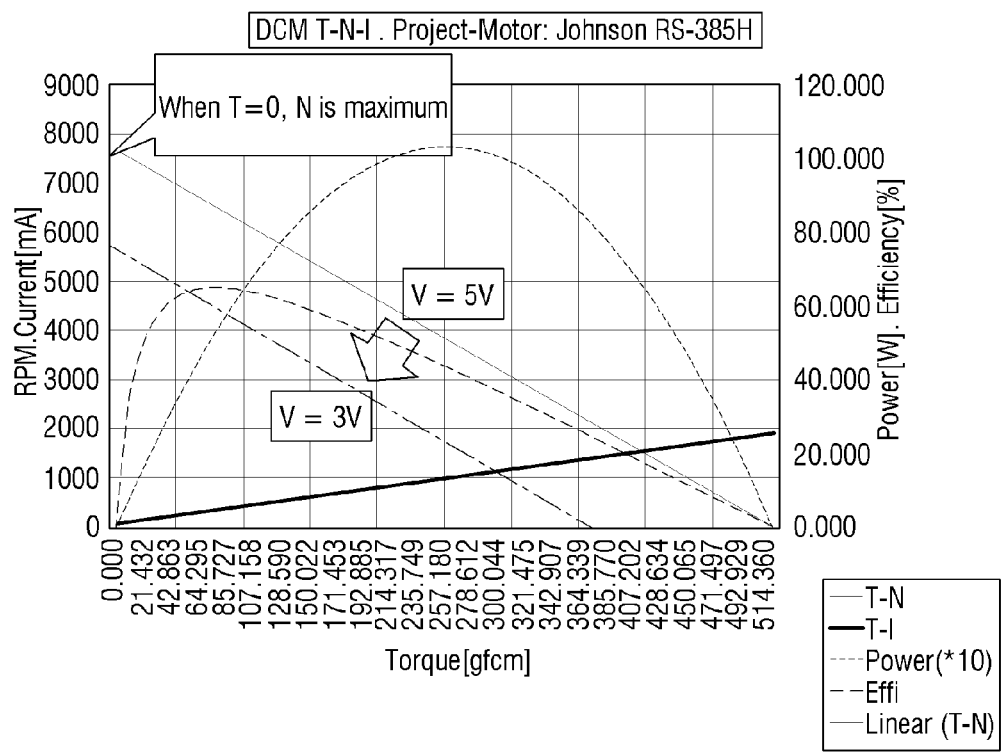

FIGS. 7 and 8 are graphs illustrating a relationship between torque and rotations per minute (RPM) with respect to input current of the DC motor 150.

FIG. 7 illustrates that an input current I and a torque T are linearly proportional to each other, and that the torque T and RPMN are inversely proportional to each other. Additionally, FIG. 8 illustrates that as the voltage that is input to the DC motor 150 is increased under a constant load, the maximum speed changes linearly.

As described above, using the torque T, the RPM N, and the input current I, one of skill in the art understands that the speed N of the DC motor 150 is inversely proportional to the level of the input current I.

That is, the DC motor 150 may generate a back EMF Vemf in proportion to the speed N of the DC motor 150, and the back EMF of the DC motor 150 may be used as a value that represents the driving speed of the DC motor 150.

The relationship between the speed N of the DC motor 150 and the generated back EMF Vemf is inherent to each DC motor 150 and is referred to as a "back EMF constant." The unit of the back EMF constant may be expressed as V/RPM.

One of skill in the art understands that it is difficult to directly measure the back EMF Vemf of the DC motor 150. However, as illustrated in FIGS. 5 and 6, because the DC motor 150 and the sensing resistor 214 are connected in series to each other, the back EMF Vemf of the DC motor 150 may be calculated using Kirchhoff's Voltage Law.

$$V_{in} = I*(R_m + R_s) + V_{emf} \quad \text{[Equation 1]}$$

In Equation 1, Vin denotes a voltage that is input to the DC motor 150, I denotes current that flows into the DC motor 150, Vemf denotes the back EMF of the DC motor 150, Rm denotes a value of a resistance Rm 153 of the DC motor 150, and Rs denotes a resistance value of the sensing resistor 214.

Equation 1 may be expressed in terms of back EMF as in Equation 2 below.

$$Vemf = Vin - (Rm + Rs)*I \quad \text{[Equation 2]}$$

Further, input current I may be expressed in terms of sensing voltage value Vsense as in Equation 3 below.

$$V_{emf} = V_{in} - ((R_m + R_s)/R_s)*I*R_s$$

$$V_{emf} = V_{in} - ((R_m + R_s)/R_s)*V_{sense} \quad \text{[Equation 3]}$$

Further, if the resistance value Rm 153 of the DC motor 150 and the resistance value of the sensing resistor are known values, the back EMF Vemf of the DC motor 150 may be calculated by determining the motor input voltage Vin and the sensed voltage Vsense. The motor speed N may be calculated as in Equation 4 below.

$$\text{MotorSpeed} = V_{emf}/\text{BackEMFConstant} \quad \text{[Equation 4]}$$

In Equation 4, BackEMFConstant denotes the back EMF constant.

Figure 9:
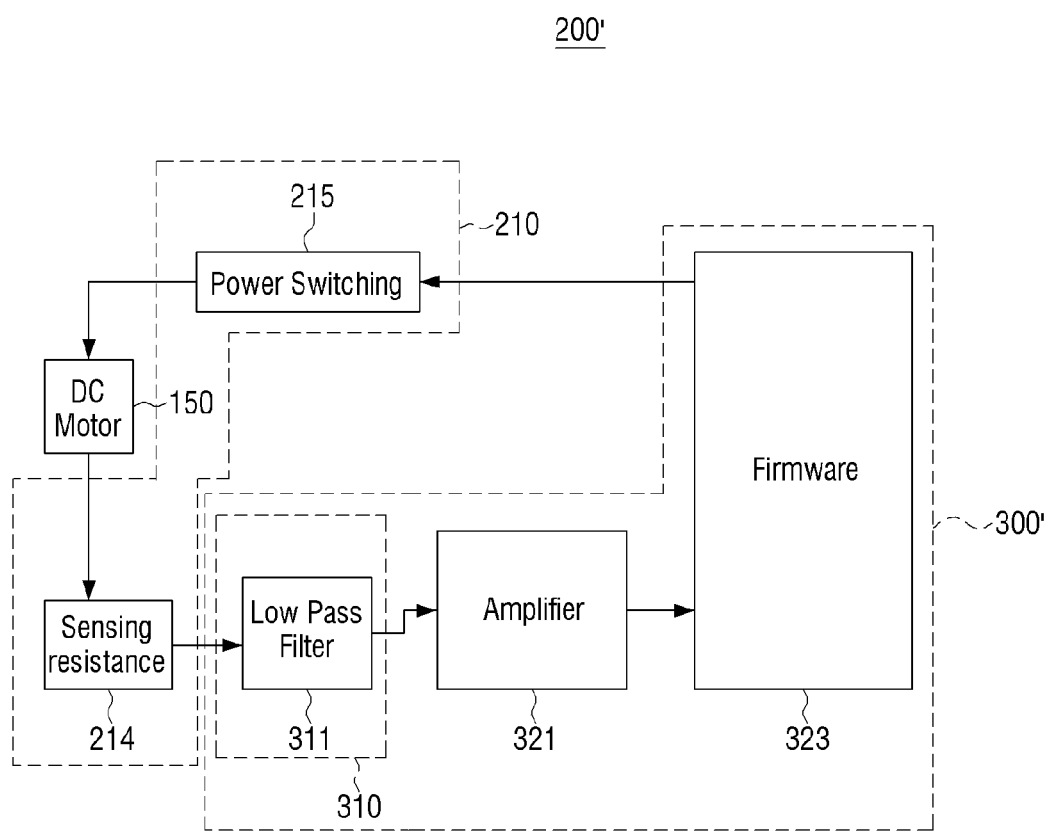
FIG. 9 is a diagram illustrating a configuration of a motor control apparatus according to a first embodiment of the present inventive concept.
Figure 10:
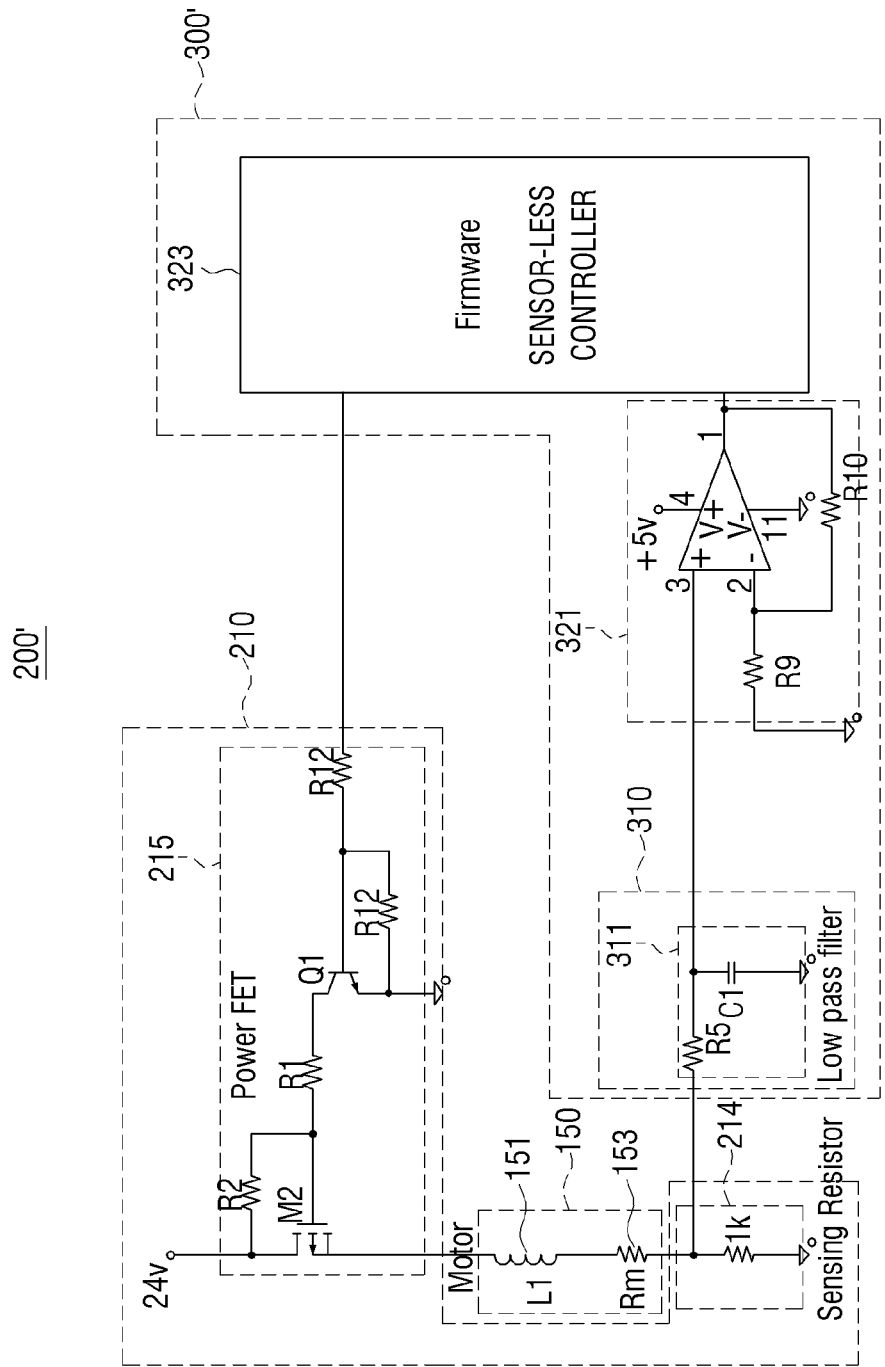
FIG. 10 is a schematic diagram illustrating the motor control apparatus according to the first embodiment of the present inventive concept.

FIG. 9 is a diagram illustrating a configuration of a motor control apparatus 200' according to a first embodiment of the present inventive concept, and FIG. 10 is a schematic diagram illustrating the motor control apparatus 200' according to the first embodiment of the present inventive concept. The drive controller 300 according to the first embodiment of the present inventive concept may use software to calculate a PWM duty cycle that corresponds to the speed N of the DC motor 150.

Referring to FIGS. 9 and 10, the motor control apparatus 200' may include the DC motor 150, the driver 210, and a drive controller 300'. Because the DC motor 150 and the driver 210 are described above, a detailed explanation of them is omitted in the explanation of the first embodiment of the present inventive concept.

The drive controller 300' may include the sensor 310, an amplifier 321, and a firmware unit 323.

The sensor 310 may sense a voltage value of the sensing resistor 214, and may output a representation of the sensed voltage value of the sensing resistor 214 as the sensed voltage value Vsense. For example, the sensor 310 may include the second-order low pass filter 311 that may comprise the resistor R5 312 and the capacitor C1 313. Although the description of this embodiment of the present inventive concept suggests that the sensor 310 may only be implemented by the second-order low pass filter 311, the present inventive concept is not limited to such an embodiment. For example, the sensor 310 may be implemented by a first-order low pass filter or a third or more-order low pass filter. Further, the sensor 310 may be implemented by an integrator in addition to a low pass filter.

The amplifier 321 may output a representation of the back EMF Vemf of the DC motor 150 based on the sensed voltage value Vsense of the sensing resistor 214. For example, the amplifier 321 may receive an input of the voltage Vin that is input to the DC motor 150 and the value Vsense that is sensed by the sensor 310, and may output a difference between the voltage Vin that is input to the DC motor 150 and a product of the value Vsense that is sensed by the sensor 310 multiplied by a gain (Gain).

Figure 12:
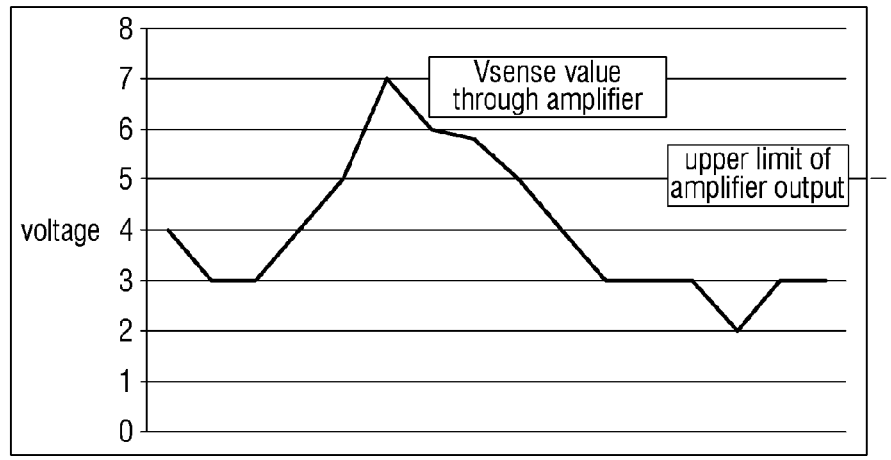
FIGS. 12A and 12B are graphs illustrating an example of an operation of an amplifier illustrated in FIG. 9.
Figure 12:
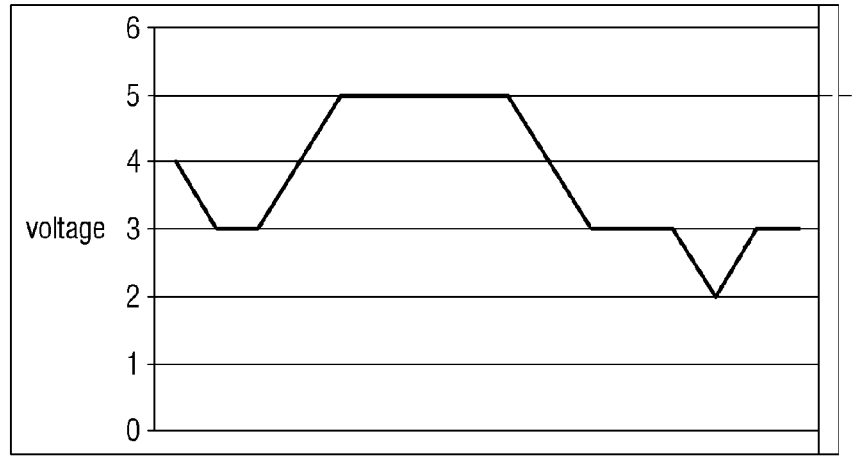

For example, the gain may be defined as (Rm+Rs)/Rs. In order to increase control resolution, it is preferable that Vsense*Gain has a value in a range as wide as possible below a power level of a control logic. If the maximum output value of the amplifier 321 exceeds an upper limit value of the output of the amplifier 321 as illustrated in a view (b) of FIG. 12, it may become impossible to maintain control. Accordingly, the maximum output value of the amplifier 321 may be set to be less than the upper limit value of the output of the amplifier 321.

The firmware unit 323 may calculate and may output the PWM duty cycle according to the calculated back EMF Vemf of the DC motor 150. For example, the firmware unit 323 may calculate the driving speed N of the DC motor 150 based on the voltage Vemf that is output from the amplifier 321. In this case, the firmware unit 323 may calculate the driving speed N of the DC motor 150 based on Equation 4.

Further, the firmware unit 323 may generate and may output the driving signal (e.g., a PWM duty cycle) that corresponds to the control command. In this case, the firmware unit 323 may perform feedback control with respect to the driving signal using the calculated driving speed N. For example, the firmware unit 323 may determine a speed error value based on the calculated driving speed N, and may determine the PWM duty cycle that corresponds to the level of the DC voltage to be supplied to the DC motor 150 based on the determined speed error value. In this case, the firmware unit 323 may determine an accumulated speed error value through accumulation of speed error values for a predetermined period of time, and may determine the PWM duty cycle based on the determined accumulated speed error value. A detailed operation of the firmware unit 323 is described below with reference to FIG. 11.

Alternatively, the firmware unit 323 may compare the driving speed N that is calculated by the calculator 320 with a target driving speed without calculating the speed error value, and if the calculated driving speed is higher than the target driving speed, the firmware unit 323 may output a control signal to reduce the PWM duty cycle that corresponds to the level of the DC voltage to be supplied to the DC motor 150. However, if the calculated driving speed is lower than the target driving speed, the firmware unit 323 may output a control signal to increase the PWM duty cycle that corresponds to the level of the DC voltage to be supplied to the DC motor 150.

Figure 11:
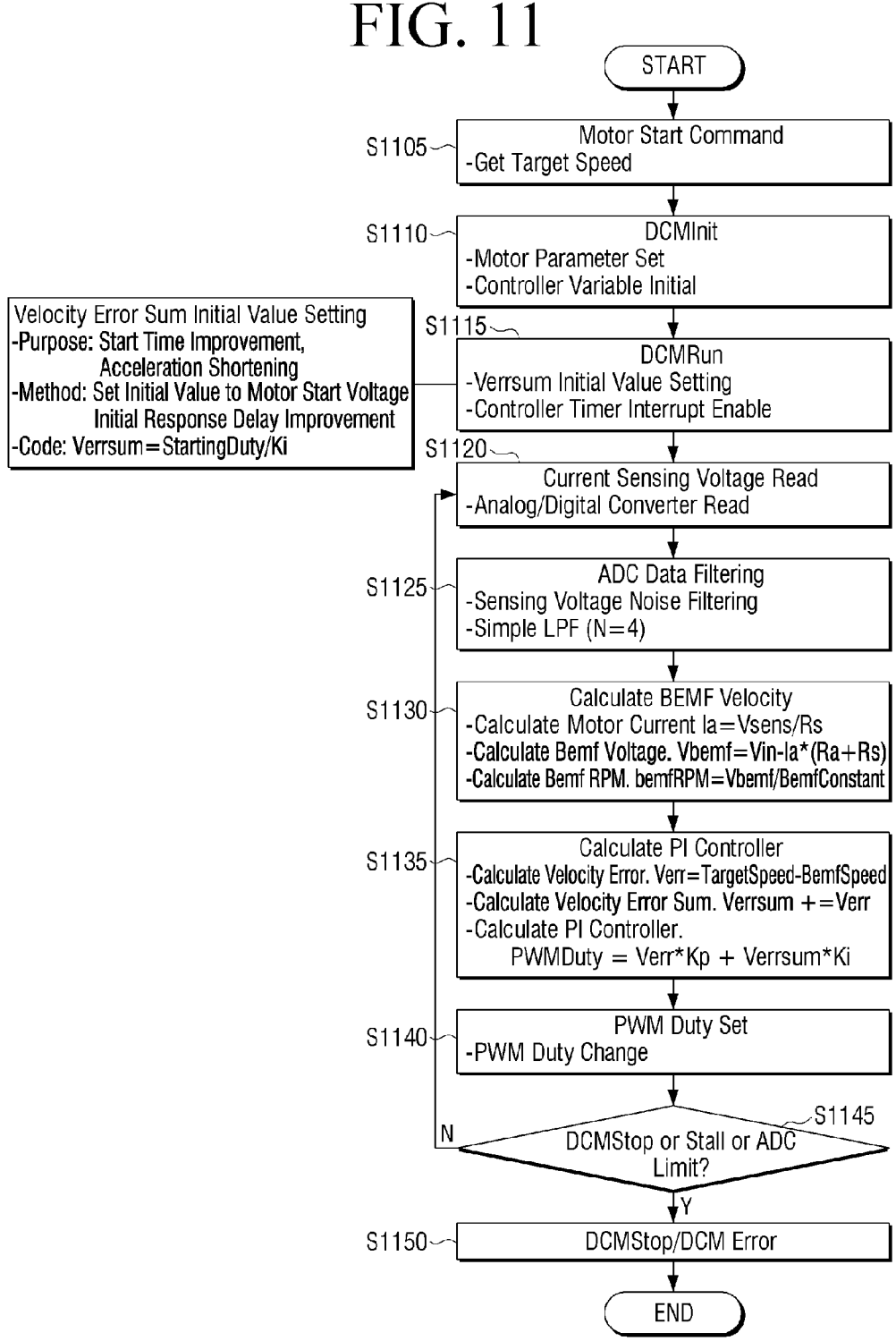
FIG. 11 is a flowchart illustrating an example of an operation of a firmware unit illustrated in FIG. 9.

FIG. 11 is a flowchart illustrating an example of an operation of the firmware unit 323 illustrated in FIG. 9.

Referring to FIG. 11, the firmware unit 323 may receive information about the target speed (S1105). For example, the target speed may be received from the controller 160 of the image forming apparatus 100.

The firmware unit 323 may initialize the motor control apparatus 200 (S1110). For example, the firmware unit 323 may set parameters for motor control, and may initialize a control variable.

Then, the firmware unit 323 may set an initial value of the speed error value (S1115). For example, the firmware unit 323 may improve a motor start time, and may set the speed error value to a predetermined initial value to shorten an acceleration time.

Then, the firmware unit 323 may sense the output voltage value of the amplifier 321 (S1120), and may perform data filtering with respect to the sensed value (S1125).

Then, the firmware unit 323 may calculate the driving speed of the DC motor 150 (S1130). For example, the firmware unit 323 may calculate the back EMF Vemf of the DC motor 150 using a difference between the output voltage value of the amplifier 321 and the DC voltage Vin that is provided to the DC motor 150, and may calculate the driving speed N of the DC motor 150 based on the calculated back EMF Vemf of the DC motor 150.

The firmware unit 323 may perform feedback control based on the calculated driving speed N (S1135). For example, the firmware unit 323 may calculate the difference between the calculated driving speed N and the target speed. In an implementation, the firmware unit 323 may use the accumulated speed error value that may be obtained by accumulating the speed differences for a predetermined period of time.

Then, the firmware unit 323 may adjust the PWM duty cycle using the calculated speed error value (S1140). For example, the firmware unit 323 may adjust the PWM duty cycle to follow the target speed using the calculated speed error value or accumulated speed error value.

Then, the firmware unit 323 may sense if the DC motor 150 is in an abnormal state (S1145). For example, the firmware unit 323 may determine if there is a problem with the DC motor 150 based on the sensed output voltage value of the amplifier 321.

If a problem is sensed, the firmware unit 323 may stop the driving of the DC motor 150 (S1150). In this case, for example, the firmware unit 323 may provide information about the problem to the controller 160 of the image forming apparatus 100.

Figure 13:
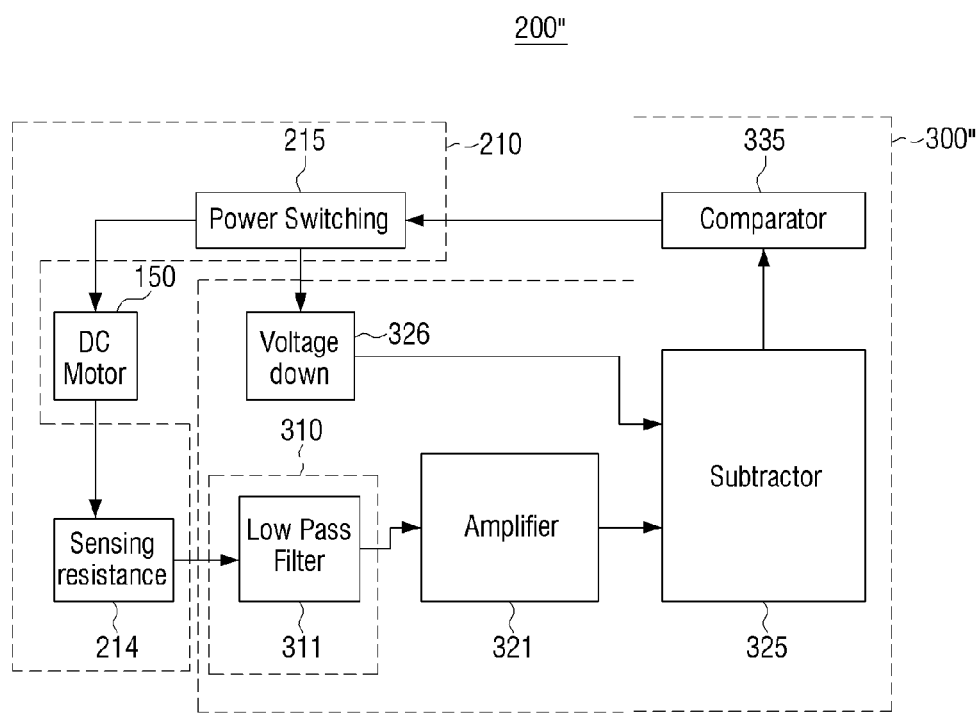
FIG. 13 is a diagram illustrating a configuration of the motor control apparatus according to a second embodiment of the present inventive concept.
Figure 14:
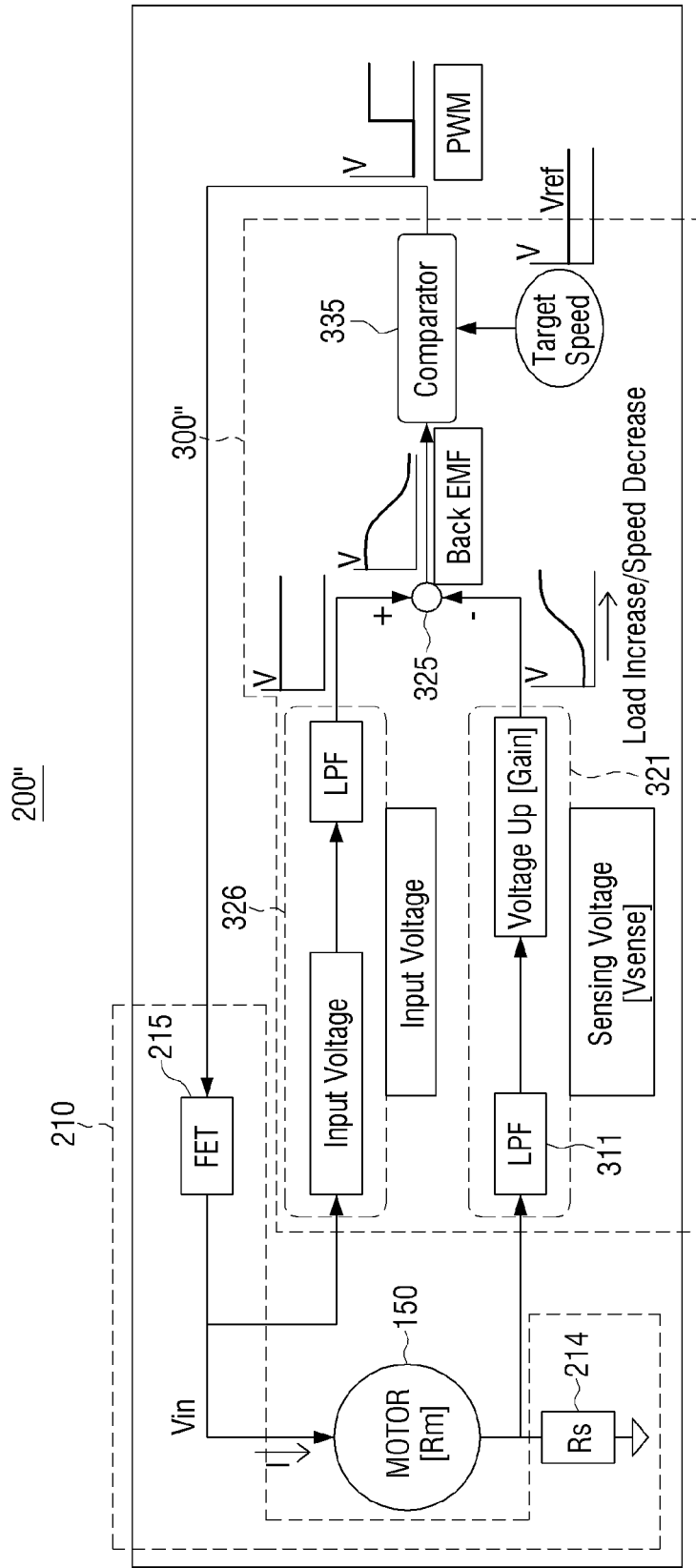
FIG. 14 is a diagram illustrating an example of an operation of the motor control apparatus according to the second embodiment of the present inventive concept.
Figure 15:
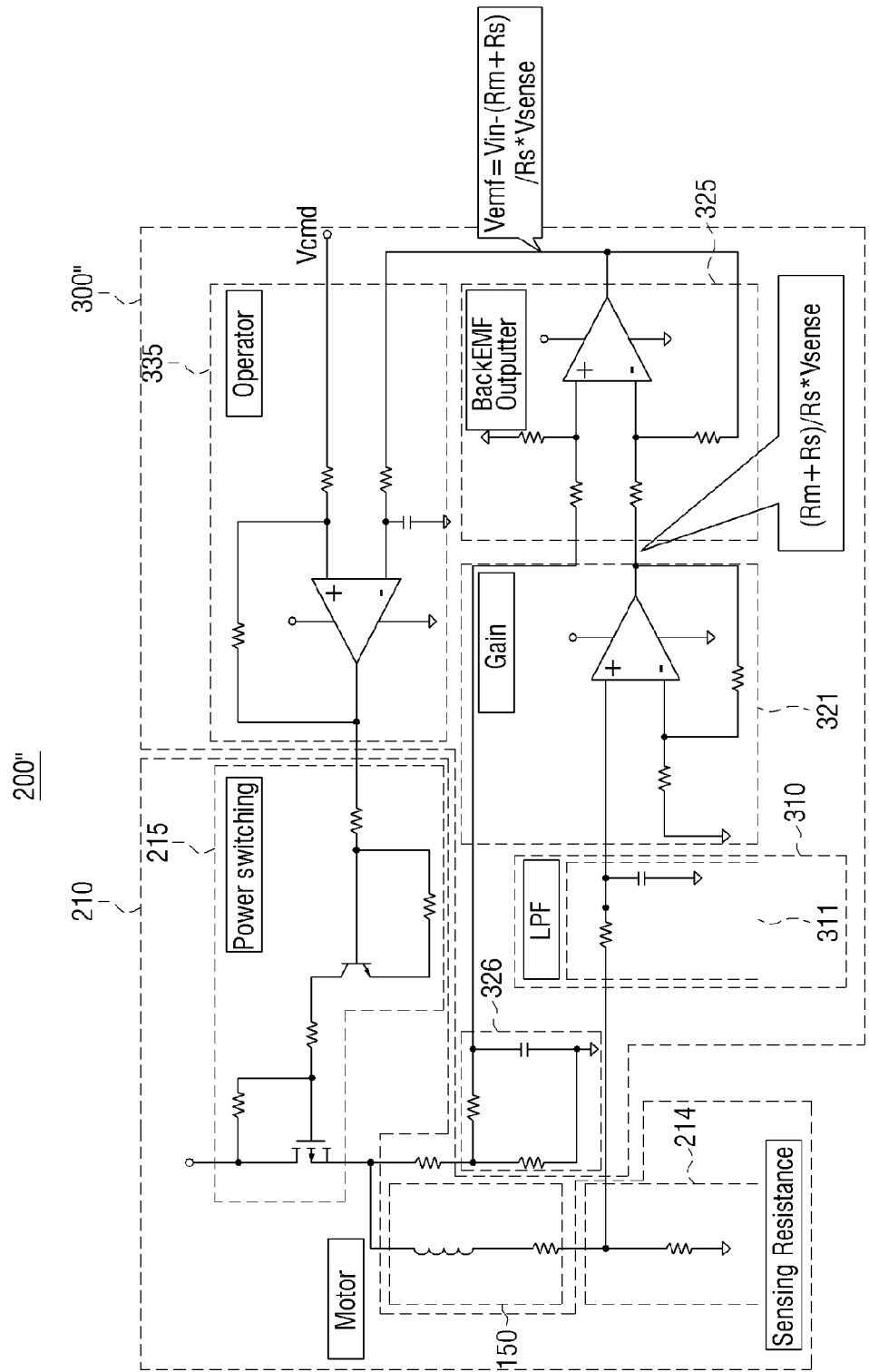
FIG. 15 is a schematic diagram illustrating the motor control apparatus according to the second embodiment of the present inventive concept.

FIG. 13 is a diagram illustrating a configuration of a motor control apparatus 200" according to a second embodiment of the present inventive concept, FIG. 14 is a diagram illustrating an example of an operation of the motor control apparatus 200" according to the second embodiment of the present inventive concept, and FIG. 15 is a schematic diagram illustrating the motor control apparatus 200" according to the second embodiment of the present inventive concept. The motor control apparatus 200" according to the second embodiment of the present inventive concept may use hardware to calculate the PWM duty cycle that corresponds to the speed N of the DC motor 150.

Referring to FIGS. 13, 14, and 15, the motor control apparatus 200" may include the DC motor 150, the driver 210, and a drive controller 300". Because the DC motor 150 and the driver 210 are described above, a detailed explanation of them is omitted in the explanation of the second embodiment of the present inventive concept.

The drive controller 300" may include the sensor 310, the first amplifier 321, a second amplifier 326, a subtractor 325, and a comparator 335. Because the sensor 310 and the first amplifier 321 are the same as those of the motor control apparatus 200' according to the first embodiment of the present inventive concept, duplicate repeated explanation of them is omitted in the explanation of the second embodiment of the present inventive concept.

The second amplifier 326 may modulate a voltage that is provided to the DC motor 150. For example, the second amplifier 326 may amplify the level of the DC voltage that is output from the driver 210 with a predetermined ratio and may output the amplified DC voltage to the subtractor 325.

The subtractor 325 may output a difference between an output of the first amplifier 321 and an output of the second amplifier 326. For example, the subtractor 325 may be configured to output the back EMF of the DC motor 150 and may subtract the output of the first amplifier 321 from the output of the second amplifier 325 to output the subtracted output.

The comparator 335 may compare the output of the subtractor 325 with a comparison voltage, and may output a result of the comparison. For example, the comparator 335 may output, as a voltage value, the difference between the back EMF of the DC motor 150 with a target voltage Vcmd. The voltage value that may be output from the comparator 335 may be the driving signal (e.g., the PWM signal) with respect to the driver 210.

Figure 16:
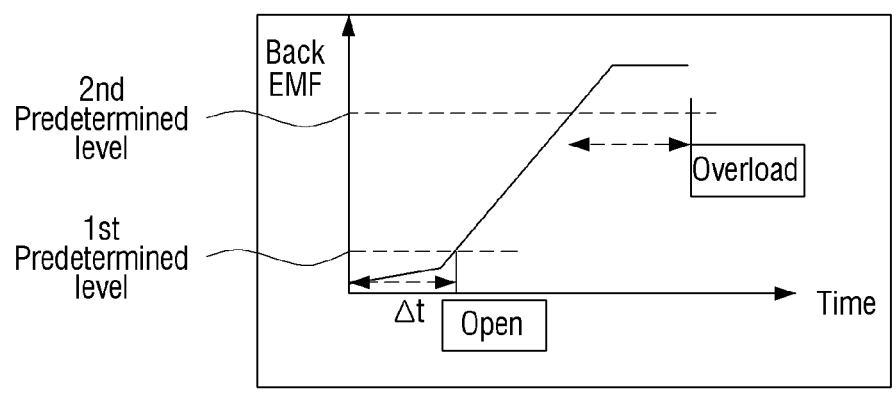
FIGS. 16 and 17 are graphs illustrating an example of a method of determining an abnormal state of a DC motor.
Figure 17:
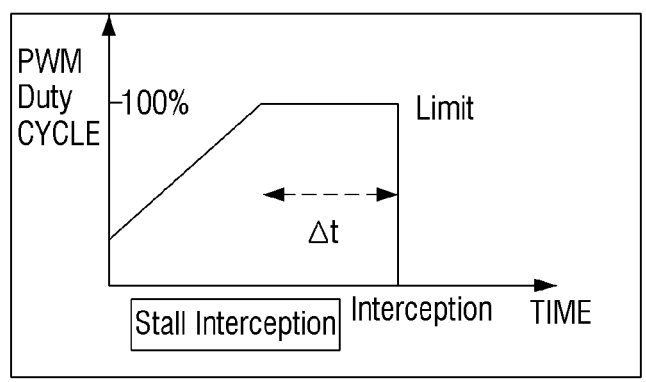

FIGS. 16 and 17 are graphs illustrating an example of a method of determining an abnormal state of the DC motor 150.

Referring to FIG. 16, if the measured back EMF of the DC motor 150 is lower than a first predetermined level, it may be determined that the DC motor 150 is not rotating. For example, if the measured back EMF of the DC motor 150 is kept lower than the first predetermined level, it may be determined that current is not flowing to the DC motor 150, or, alternatively, that the current leaks.

If the measured back EMF of the DC motor 150 is kept at a second predetermined level, it may be determined that the DC motor 150 is overloaded.

Referring to FIG. 17, if the PWM duty cycle is kept at 100%, then the DC motor 150 may be unable to follow the target speed even though the maximum voltage is supplied to the DC motor 150, and thus it may be determined that the DC motor 150 has stalled. Accordingly, if the sensed speed does not reach the target speed even though the PWM duty cycle is kept 100%, the drive controller 300 may determine that the DC motor 150 has stalled and stop driving the DC motor 150.

Figure 18:
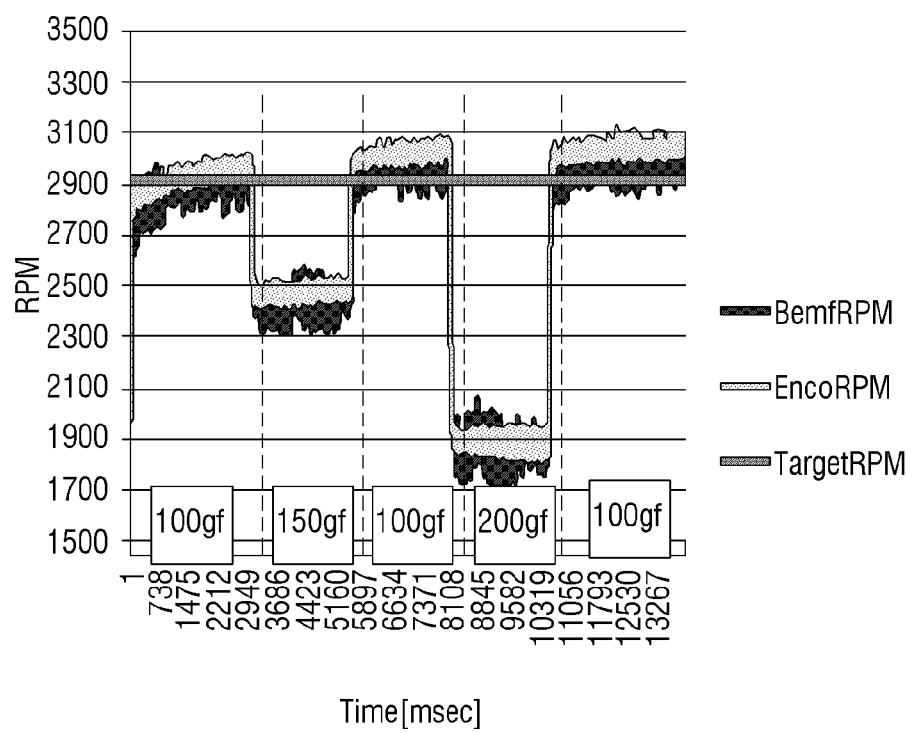
FIG. 18 is a graph illustrating a speed performance of the DC motor for a load variation according to a control method of the related art.
Figure 19:
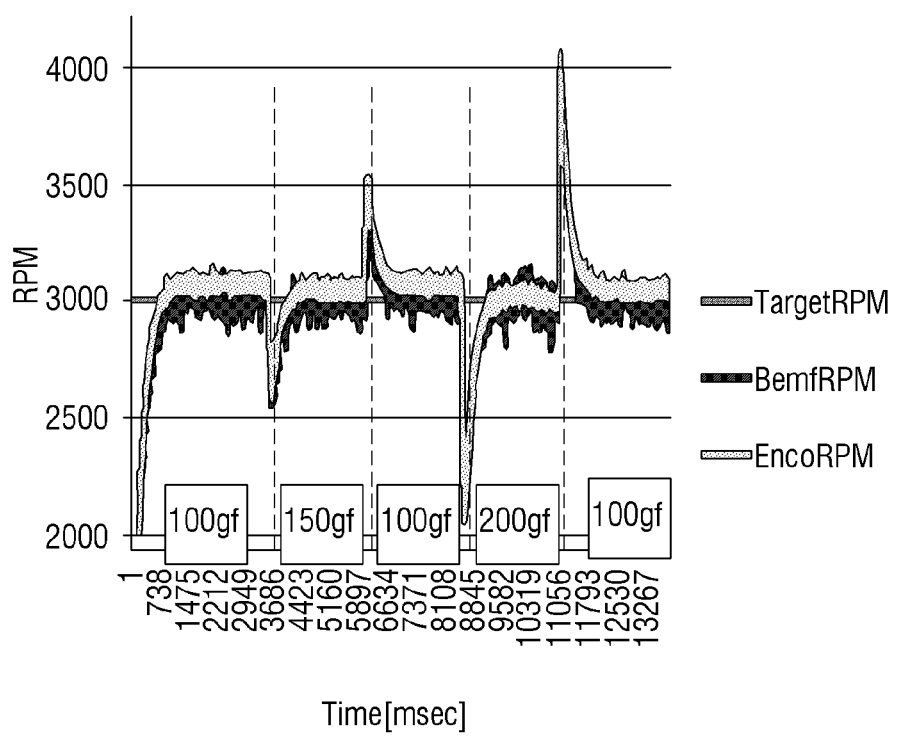
FIG. 19 is a graph illustrating the speed performance of the DC motor using a speed estimation method according to an embodiment of the present inventive concept.

FIG. 18 is a graph illustrating a speed performance of the DC motor 150 for a load variation according to a control method of the related art, and FIG. 19 is a graph illustrating the speed performance of the DC motor 150 using a speed estimation method according to an embodiment of the present inventive concept.

Referring to FIG. 18, in a case of an open-loop control method of the related art, if the load is varied, it may be confirmed that an actual speed Bemf RPM of the DC motor 150 is unable to follow a target speed Target RPM. For example, if the load level is in a section (e.g., 150 gf or 200 gf) other than 100 gf, it may be confirmed that the DC motor 150 is driven at a speed that is lower than the target speed.

However, referring to FIG. 19, which illustrates the speed performance of the DC motor 150 according to an embodiment of the present inventive concept, it may be confirmed that the DC motor 150 speed follows the target speed.

FIG. 20 is a diagram illustrating a configuration of an image forming apparatus 100' according to another embodiment of the present inventive concept. In FIG. 20, elements that perform the same functions as the configuration illustrated in FIG. 1 are omitted.

Referring to FIG. 20, the image forming apparatus 100' may include a plurality of DC motors 150-1, 150-2, 150-3, and 150-4 and a motor control apparatus 200'''.

The motor control apparatus 200''' may control the plurality of DC motors 150-1, 150-2, 150-3, and 150-4. For example, the motor control apparatus 200''' may include a plurality of drivers (not illustrated) and one drive controller (not illustrated).

The motor control apparatus 200''' may receive control commands for the plurality of DC motors 150-1, 150-2, 150-3, and 150-4, may measure respective driving speeds of the plurality of DC motors 150-1, 150-2, 150-3, and 150-4, and may control the plurality of drivers so that a voltage of each respective driver is at a level that corresponds to the measured respective driving speed.

Although the description of this embodiment of the present inventive concept suggests that the motor control apparatus 200''' controls only four identical DC motors 150-1, 150-2, 150-3, and 150-4, the present inventive concept is not limited to such an embodiment. For example, the motor control apparatus 200''' may be configured to control a brushless DC electric motor (BLDC) motor (not illustrated) and/or a step motor (not illustrated), while generating the driving signals for the DC motors 150-1, 150-2, 150-3, and 150-4.

Figure 21:
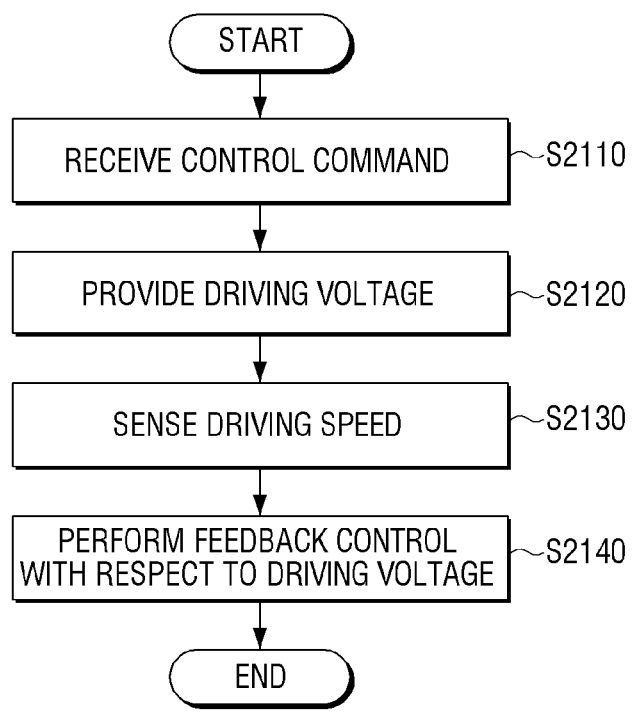
FIG. 21 is a flowchart illustrating a method of controlling the DC motor 150 according to an embodiment of the present inventive concept.

FIG. 21 is a flowchart illustrating a method of controlling the DC motor 150 according to an embodiment of the present inventive concept.

Referring to FIG. 21, a control command for the DC motor 150 may be received (S2110). For example, the control command may include control commands, such as a start/stop of a rotation of the plurality of DC motor 150, an acceleration/deceleration command for the DC motor 150, and/or a speed command value for the DC motor 150. The control command may be control commands for the plurality of DC motors 150-1, 150-2, 150-3, and 150-4.

Then, a voltage of a predetermined level may be provided to the DC motor 150 according to the control command (S2120). For example, if the control command is a rotation start command, a predetermined initial DC voltage (e.g., a PWM waveform voltage) may be provided to the DC motor 150.

Further, the operating speed of the DC motor 150 may be sensed using the voltage value of the resistor 214 that measures current that flows through the coil 151 of the DC motor 150 (S2130). Since the method of sensing the operating speed of the DC motor 150 has been described with reference to FIGS. 7 and 8, repeated explanation of this method is omitted.

Then, feedback control may be performed to supply the voltage that corresponds to the sensed load level (S2140). Since the method of varying the constant current according to the sensed operating voltage has been described with reference to FIGS. 7 and 8, repeated explanation of this method is omitted. For example, the PWM duty cycle may be varied using a value of the difference between the sensed operating speed and the target speed or the value of the difference value accumulated for a predetermined period of time.

As described above, according to the DC motor 150 control method according to this embodiment of the present inventive concept, the driving speed of the DC motor 150 may be calculated using the resistor 214 that senses the current that flows through the DC motor 150, and the DC motor 150 may be controlled in accordance with the calculated driving speed. Accordingly, it may not be necessary to use a sensor to measure the speed, and thus the manufacturing cost may be reduced. Further, since it may not be necessary to provide a space to accommodate such a sensor, the space used for a mechanical portion of the image forming apparatus 100 may be reduced. The DC motor 150 control method as illustrated in FIG. 21 may be performed by the image forming apparatus 100 that has a configuration, for example, as illustrated in FIG. 1 or the motor control apparatus 200 that has a configuration, for example, as illustrated in FIG. 3. Alternatively, the DC motor 150 control method as illustrated in FIG. 21 may be performed by an image forming apparatus or a motor control apparatus that has a configuration different from the configuration illustrated, respectively, in FIGS. 1 and 3.

Figure 22:
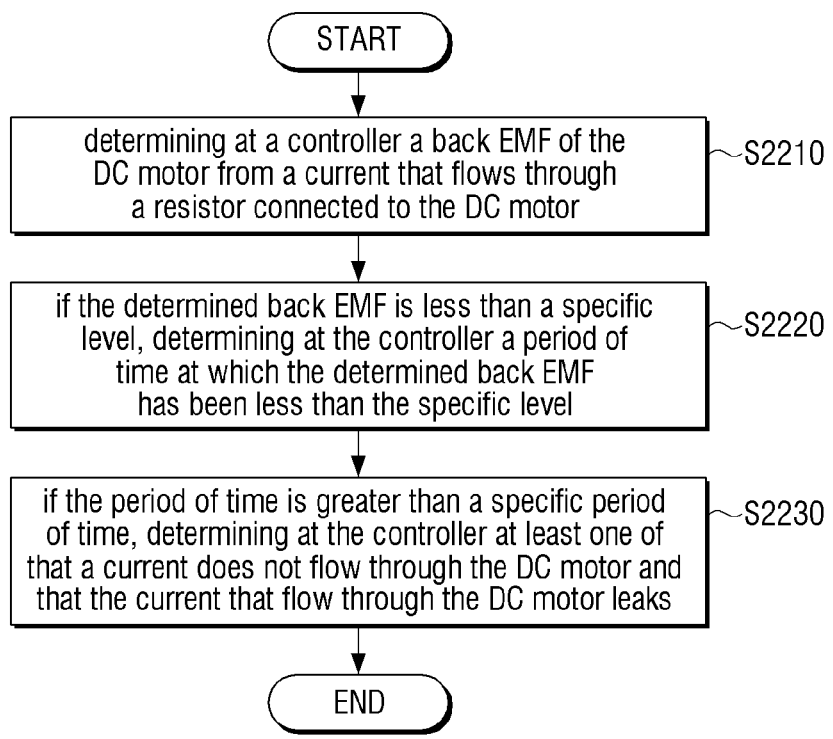
FIG. 22 is a flowchart illustrating a method of determining an abnormal state of the DC motor 150 according to a first embodiment of the present inventive concept.

FIG. 22 is a flowchart illustrating a method of determining an abnormal state of the DC motor 150 according to a first embodiment of the present inventive concept.

At an operation S2210, a back EMF of the DC motor 150 is determined at the controller 300 from a current that flows through the resistor 214 connected to the DC motor 150.

At an operation S2220, if the determined back EMF is less than a specific level, the controller 300 determines a period of time at which the determined back EMF has been less than the specific level.

At an operation S2230, if the period of time is greater than a specific period of time, the controller 300 determines at least one of that a current does not flow through the DC motor 150 and that the current that flows through the DC motor 140 leaks.

Figure 23:
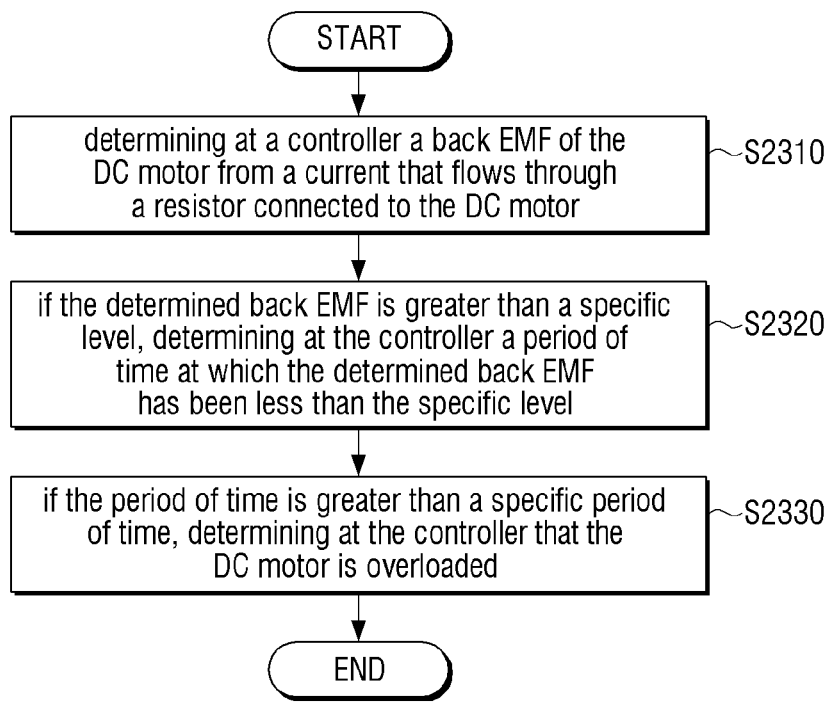
FIG. 23 is a flowchart illustrating a method of determining an abnormal state of the DC motor 150 according to a second embodiment of the present inventive concept.

FIG. 23 is a flowchart illustrating a method of determining an abnormal state of the DC motor 150 according to a second embodiment of the present inventive concept.

At an operation S2310, a back EMF of the DC motor 150 is determined at the controller 300 from a current that flows through the resistor 214 connected to the DC motor 150.

At an operation S2320, if the determined back EMF is greater than a specific level, the controller 300 determines a period of time at which the determined back EMF has been greater than the specific level.

At an operation S2330, if the period of time is greater than a specific period of time, the controller 300 determines that the DC motor 150 is overloaded.

Figure 24:
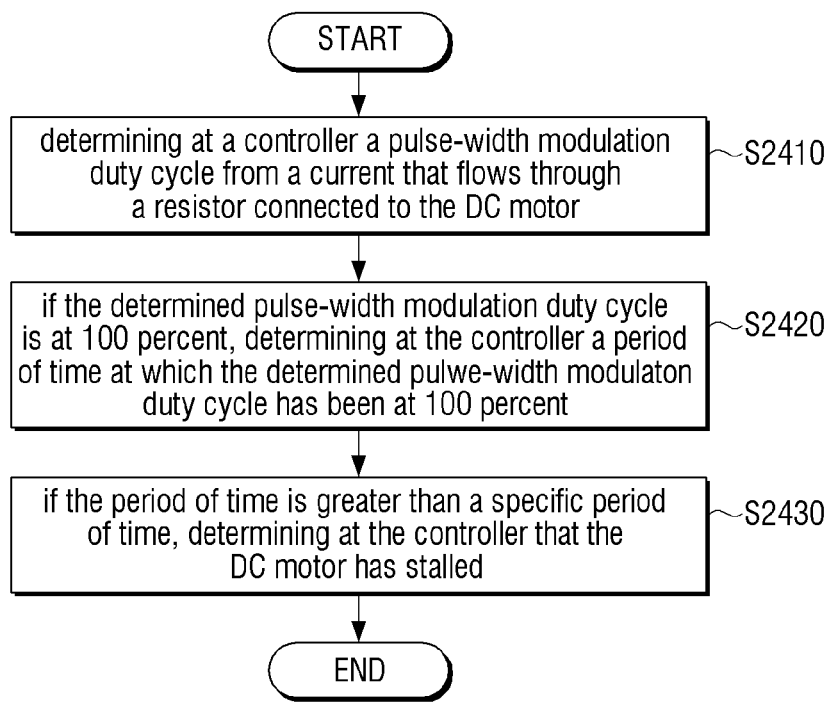
FIG. 24 is a flowchart illustrating a method of determining an abnormal state of the DC motor 150 according to a third embodiment of the present inventive concept.

FIG. 24 is a flowchart illustrating a method of determining an abnormal state of the DC motor 150 according to a third embodiment of the present inventive concept.

At an operation 2410, a pulse-width modulation duty cycle is determined at the controller 300 from a current that flows through the resistor 214 connected to the DC motor 150.

At an operation 2420, if the determined pulse-width modulation duty cycle is at 100 percent, the controller 300 determines a period of time at which the determined pulse-width modulation duty cycle has been at 100 percent.

At an operation 2430, if the period of time is greater than a specific period of time, the controller 300 determines that the DC motor 150 has stalled.

Further, the DC motor 150 control method as described above may be implemented by a program (or application software) that may include an executable algorithm that may be executed by a computer, and the program may be stored and then provided in a computer readable medium. The computer-readable medium may include a non-transitory computer-readable recording medium and a computer-readable transmission medium.

A non-transitory computer readable medium is not a medium that stores data for a short period, such as a register, a cache, or a memory, but rather is a medium which semi-permanently stores data and is readable by a device. For example, various applications and programs as described above may be stored and provided in a non-transitory computer readable medium, such as, read-only memory (ROM), random-access memory (RAM), a compact disc (CD), CD-ROMs, magnetic tapes, floppy disks, optical data storage devices, a digital video disc (DVD), a hard disc, a Blu-ray disc, a Universal Serial Bus (USB) memory device, and a memory card. The non-transitory computer-readable recording medium may also be distributed over network coupled computer systems so that the computer-readable code is stored and executed in a distributed fashion. The computer-readable transmission medium may be transmitted through carrier waves or signals (e.g., wired or wireless data transmission through the Internet). Also, functional programs, codes, and code segments to accomplish the present general inventive concept may be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:
an engine portion configured to perform image forming;
a direct current (DC) motor configured to mechanically operate the engine portion;
a driver including a resistor to measure current that flows to the DC motor and configured to provide a predetermined voltage to the DC motor according to the measured current; and
a drive controller configured to measure a driving speed of the DC motor based on a voltage value of the resistor, to calculate a pulse-width modulation (PWM) duty cycle that corresponds to the diving speed measured by the drive controller, and to control the driver to provide a voltage that corresponds to the calculated PWM duty cycle,
wherein the drive controller comprises:
a sensor configured to sense the voltage value of the resistor,
a calculator configured to calculate the driving speed of the DC motor based on the sensed voltage value of the resistor,
a determinator configured to determine a level of DC voltage to be supplied to the DC motor based on the calculated driving speed, and
an outputter configured to output a control value that corresponds to the determined level of the DC voltage to be supplied to the DC motor, and
wherein the calculator comprises an amplifier configured to amplify the sensed voltage value, and to calculate the driving speed of the DC motor based on the sensed voltage value that is amplified by the amplifier.

2. The image forming apparatus as claimed in claim 1, wherein the sensor is configured to perform smoothing and to sense the voltage value of the resistor.

3. The image forming apparatus as claimed in claim 2, wherein the sensor comprises a low pass filter connected to one terminal of the resistor of the driver, and is configured to sense an output voltage of the low pass filter as the voltage value of the resistor.

4. The image forming apparatus as claimed in claim 1, wherein the calculator is configured to calculate the driving speed of the DC motor based on the sensed voltage value and the voltage value that is applied to the DC motor.

5. The image forming apparatus as claimed in claim 1, wherein the drive controller is configured to sense whether the DC motor is in an abnormal state based on the calculated PWM duty cycle.

6. The image forming apparatus as claimed in claim 1, wherein the DC motor is a plurality of DC motors and the driver is a plurality of drivers, and
the drive controller is configured to control each of the plurality of drivers to measure a respective driving speed of a corresponding one of the plurality of DC motors and to provide a respective driving voltage to the corresponding one of the plurality of DC motors that corresponds to the respective driving speed.

7. An image forming apparatus, comprising:
an engine portion configured to perform image forming;
a direct current (DC) motor configured to mechanically operate the engine portion;
a driver including a resistor to measure current that flows to the DC motor and configured to provide a predetermined voltage to the DC motor according to the measured current; and
a drive controller configured to measure a driving speed of the DC motor based on a voltage value of the resistor, to calculate a pulse-width modulation (PWM) duty cycle that corresponds to the driving speed measured by the drive controller, and to control the drive to provide a voltage that corresponds to the calculated PWM duty cycle,
wherein the drive controller comprises:
a sensor configured to sense the voltage value of the resistor,
a calculator configured to calculate the driving speed of the DC motor based on the sensed voltage value of the resistor, a determinator configured to determine a level of DC voltage to be supplied to the DC motor based on the calculated driving speed, and an outputter configured to output a control value that corresponds to the determined level of the DC voltage to be supplied to the DC motor, and wherein the calculator is configured to calculate a back EMF of the DC motor based on a following equation, and to calculate the driving speed of the DC motor using the calculated back EMF and a back EMF constant, $$Vemf=Vin-\{(Rm+Rs)/Rs\}*Vsense$$

where, Vemf denotes the voltage value that corresponds to the calculated driving speed, Vin denotes the voltage value input to the DC motor, Vsense denotes the voltage value of the resistor, Rm denotes the resistance value of the DC motor, and Rs denotes the resistance value of the resistor.

8. An image forming apparatus, comprising:
an engine portion configured to perform image forming;
a direct current (DC) motor configured to mechanically operate the engine portion;
a driver including a resistor to measure current that flows to the DC motor and configured to provide a predetermined voltage to the DC motor according to the measure current; and
a drive controller configured to measure a driving speed of the DC motor based on a voltage value of the resistor, to calculate a pulse-width modulation (PWM) duty cycle that corresponds to the driving speed measured by the drive controller, and to control the driver to provide a voltage that corresponds to the calculated PWM duty cycle,
wherein the drive controller comprises:
　a sensor configured to sense the voltage value of the resistor,
　a calculator configured to calculate the driving speed of the DC motor based on the sensed voltage value of the resistor,
　a determinator configured to determine a level of DC voltage to be supplied to the DC motor based on the calculated driving speed, and
　an outputter configured to output a control value that corresponds to the determined level of the DC voltage to be supplied to the DC motor, and
wherein the determinator is configured to determine a speed error value based on the calculated driving speed, and to determine a pulse-width modulation (PWM) duty cycle that corresponds to the level of the DC voltage to be supplied to the DC motor based on the determined speed error value.

9. An image forming apparatus, comprising:
an engine portion configured to perform image forming;
a direct current (DC) motor configured to mechanically operate the engine portion;
a driver including a resistor to measure current that flows to the DC motor and configured to provide a predetermined voltage to the DC motor according to the measured current;and
a drive controller configured to measure a driving speed of the DC motor based on a voltage value of the resistor, to calculate a pulse-width modulation (PWM) duty cycle that corresponds to the driving speed measured by the driver controller, and to control the driver to provide a voltage that corresponds to the calculated PWM duty cycle,
wherein the drive controller comprises:
　a sensor configured to sense the voltage value of the resistor,
　a calculator configured to calculate the driving speed of the DC motor based on the sensed voltage value of the resistor,
　a determinator configured to determine a level of DC voltage to be supplied to the DC motor based on the calculated driving speed, and
　an outputter configured to output a control value that corresponds to the determined level of the DC voltage to be supplied to the DC motor, and
wherein the determinator is configured to compare the calculated driving speed with a target driving speed, and if the calculated driving speed is higher than the target driving speed, the determinator is configured to output a control signal to reduce a PWM duty cycle that corresponds to the level of the DC voltage to be supplied to the DC motor, while if the calculated driving speed is lower than the target driving speed, the determinator is configured to output a control signal to increase the PWM duty cycle.

10. A motor control apparatus, comprising:
a direct current (DC) motor;
a driver including a resistor to measure current that flows to the DC motor and configured to provide a predetermined voltage to the DC motor according to the measured current; and
a drive controller configured to measure a driving speed of the DC motor based on a voltage value of the resistor, to calculate a pulse-width modulation (PWM) duty cycle that corresponds to the driving speed measured by the drive controller, and to control the driver to provide a voltage that corresponds to the calculated PWM duty cycle,
wherein the drive controller comprises:
　a sensor configured to sense the voltage value of the resistor,
　a calculator configured to calculate the driving speed of the DC motor based on the sensed voltage value of the resistor,
　a determinator configured to determine a level of the DC voltage to be supplied to the DC motor based on the calculated driving speed, and
　an outputter configured to output a control value that corresponds to the determined level of the DC voltage to be supplied to the DC motor, and
wherein the calculator is configured to calculate a back EMF of the DC motor based on the sensed voltage value and the voltage value that is applied to the DC motor, and to calculate the driving speed of the DC motor using the calculated back EMF and a back EMF constant.

11. The motor control apparatus as claimed in claim 10, wherein the sensor is configured to perform smoothing and to sense the voltage value of the resistor.

12. The motor control apparatus as claimed in claim 10, wherein the drive controller is configured to sense whether the DC motor is in an abnormal state based on the calculated PWM duty cycle.

13. A motor control apparatus, comprising:
a direct current (DC) motor;
a driver including a resistor to measure current that flows to the DC motor and configured to provide a predetermined voltage to the DC motor according to the measured current; and a drive controller configured to measure a driving speed of the DC motor based on a voltage value of the resistor, to calculate a pulse-width modulation (PWM) duty cycle that corresponds to the driving speed measured by the drive controller, and to control the driver to provide a voltage that corresponds to the calculated PWM duty cycle, wherein the drive controller comprises:
- a sensor configured to sense the voltage value of the resistor,
- a calculator configured to calculate the driving speed of the DC motor based on the sensed voltage value of the resistor,
- a determinator configured to determine a level of the DC voltage to be supplied ot the DC motor based on the calculated driving speed, and
- an outputter configured to output a control value that corresponds to the determined level of the DC voltage to be supplied to the DC motor, and wherein the determinator is configured to determine a speed error value based on the calculated driving speed, and to determine a pulse-width modulation (PWM) duty cycle that corresponds to the level of the DC voltage to be supplied to the DC motor based on the determined speed error value.

14. The motor control apparatus as claimed in claim 13, wherein the determinator is configured to determine an accumulated speed error value through accumulation of speed error values, and to determine the PWM duty cycle based on the determined accumulated speed error value.

15. A motor control apparatus, comprising:
- a direct current (DC) motor;
- a driver including a resistor to measure current that flow to the DC motor and configured to provide a predetermined voltage to the DC motor according to the measured current; and
- a drive controller configured to measure a driving speed of the DC motor based on a voltage value of the resistor, to calculate a pulse-width modulation (PWM) duty cycle that corresponds to the driving speed measured by the drive controller, and to control the driver to provide a voltage that corresponds to the calculated PWM duty cycle, wherein the drive controller comprises:
- a sensor configured to sense the voltage value of the resistor,
- a calculator configured to calculate the driving speed of the DC motor based on the sensed voltage value of the resistor,
- a determinator configured to determine a level of the DC voltage to be supplied to the DC motor based on the calculated driving speed, and
- an outputter configured to output a control value that corresponds to the determined level of the DC voltage to be supplied to the DC motor, and wherein the determinator is configured to compare the calculated driving speed with a target driving speed, and if the calculated driving speed is higher than the target driving speed, the determinator is configured to output a control signal to reduce a PWM duty cycle that corresponds to the level of the DC voltage to be supplied to the DC motor, while if the calculated driving speed is lower than the target driving speed, the determinator is configured to output a control signal to increase the PWM duty cycle.

16. A method of controlling a direct current (DC) motor, comprising:
- receiving a control command for the DC motor;
- measuring a driving speed of the DC motor based on current that flows to a coil of the DC motor using a sensor configured to sense a voltage value of a resistor used to measure current that flows to the coil of the DC motor;
- calculating a pulse-width modulation (PWM) duty cycle that corresponds to the measured driving speed based on the sensed voltage value of the resistor,
- wherein the sensed voltage value of the resistor is amplified by an amplifier, and the calculating of the PWM duty cycle is based on the sensed voltage value that is amplified by the amplifier;
- determining a level of DC voltage to be supplied to the DC motor based on one or more of the measured driving speed and the calculated PWM duty cycle; and
- providing a voltage having a level that corresponds to one or more of the calculated PWM duty cycle and the determined level of the DC voltage to the DC motor in accordance with the control command.

* * * * *